(12) United States Patent
Sjaastad et al.

(10) Patent No.: US 11,596,261 B2
(45) Date of Patent: Mar. 7, 2023

(54) FILTER STAND AGITATOR FOR BREWING, STEEPING OR INFUSING A LIQUID

(71) Applicant: Kinetic Ideations, Inc., Sunnyvale, CA (US)

(72) Inventors: Mike Sjaastad, Sunnyvale, CA (US); Lou Lederer, Sunnyvale, CA (US); Fred Sklenar, Saint Paul, MN (US)

(73) Assignee: KINETIC IDEATIONS, INC., Sunnyvale, CA (US)

( * ) Notice: Subject to any disclaimer, the term of this patent is extended or adjusted under 35 U.S.C. 154(b) by 352 days.

(21) Appl. No.: 16/987,178

(22) Filed: Aug. 6, 2020

(65) Prior Publication Data

US 2021/0038016 A1 Feb. 11, 2021

Related U.S. Application Data

(60) Provisional application No. 62/883,908, filed on Aug. 7, 2019.

(51) Int. Cl.
| | |
|---|---|
| *A47J 31/02* | (2006.01) |
| *A47J 31/44* | (2006.01) |
| *B06B 1/16* | (2006.01) |
| *B01F 31/86* | (2022.01) |
| *A47J 31/06* | (2006.01) |
| *A47J 31/08* | (2006.01) |
| *B01F 31/60* | (2022.01) |

(52) U.S. Cl.
CPC ............ *A47J 31/446* (2013.01); *A47J 31/02* (2013.01); *B01F 31/86* (2022.01); *B06B 1/161* (2013.01); *A47J 31/0636* (2013.01); *A47J 31/08* (2013.01); *B01F 31/60* (2022.01)

(58) Field of Classification Search
CPC . A47J 31/02; A47J 31/08; B01F 31/30; B01F 31/46; B01F 31/60; B01F 31/80; B01F 31/86
USPC .................... 99/287, 306; 366/110, 111, 114
See application file for complete search history.

(56) References Cited

U.S. PATENT DOCUMENTS

| | | |
|---|---|---|
| 2,392,452 A | 1/1946 | Baumann |
| 3,046,869 A | 7/1962 | Reynolds |
| 3,171,344 A | 3/1965 | Mathieu et al. |

(Continued)

FOREIGN PATENT DOCUMENTS

| | | | | |
|---|---|---|---|---|
| KR | 10-1382604 | * | 1/2014 | ............. A47J 31/02 |
| KR | 10-1669950 | | 11/2016 | |

(Continued)

OTHER PUBLICATIONS

International Search Report and Written Opinion dated Jul. 4, 2018 in International Application No. PCT/US2018/018829 filed: Feb. 20, 2018 and published as: WO/2018/156520 dated Aug. 30, 2018.

(Continued)

*Primary Examiner* — Reginald Alexander
(74) *Attorney, Agent, or Firm* — Schmeiser, Olsen & Watts LLP

(57) ABSTRACT

Device and method embodiments discussed herein may be used to enhance a brewing process, extraction process, steeping process or infusing process. Such infusion processes may be used for making coffee, tea, oil, alcohol or any other suitable infused liquid where a user desires to enhance or control such a process.

21 Claims, 28 Drawing Sheets

(56) References Cited

U.S. PATENT DOCUMENTS

| | | | |
|---|---|---|---|
| 4,217,065 A | | 8/1980 | Stilwell |
| 4,779,520 A | * | 10/1988 | Hauslein ............ A47J 31/0631 |
| | | | 99/287 |
| 4,983,412 A | * | 1/1991 | Hauslein ............ A47J 31/0631 |
| | | | 426/433 |
| 5,894,786 A | * | 4/1999 | Miya ...................... A47J 31/06 |
| | | | 210/477 |
| 2008/0202346 A1 | | 8/2008 | Accumanno et al. |
| 2009/0041864 A1 | | 2/2009 | Warlick |
| 2010/0272870 A1 | | 10/2010 | Hsu et al. |
| 2011/0005400 A1 | * | 1/2011 | Tien ...................... A47J 31/02 |
| | | | 99/298 |
| 2011/0056386 A1 | | 3/2011 | Taketani |
| 2011/0297004 A1 | | 12/2011 | Figura |
| 2012/0308688 A1 | | 12/2012 | Peterson et al. |
| 2014/0263780 A1 | | 9/2014 | Day, Jr. |
| 2015/0305551 A1 | | 10/2015 | Rosati |
| 2016/0235244 A1 | | 8/2016 | Bezzera |
| 2017/0295983 A1 | | 10/2017 | Tseng |
| 2018/0332996 A1 | | 11/2018 | Lee |
| 2020/0008611 A1 | | 1/2020 | Sjaastad et al. |
| 2021/0235918 A1 | * | 8/2021 | Chen ........................ A23F 5/26 |

FOREIGN PATENT DOCUMENTS

| | | |
|---|---|---|
| WO | WO 17/209443 | 12/2017 |
| WO | WO 18/156520 | 8/2019 |
| WO | WO 20/033541 | 2/2020 |

OTHER PUBLICATIONS

International Preliminary Report dated Aug. 27, 2019 in International Application No. PCT/US2018/018829 filed: Feb. 20, 2018 and published as: WO/2018/156520 dated Aug. 30, 2018.

International Search Report and Written Opinion dated Dec. 11, 2019 in International Application No. PCT/US2019/45499 filed Aug. 7, 2019 and published as: WO/2020/033541 dated Feb. 13, 2020.

International Preliminary Report on Patentability dated Feb. 9, 2021 in International Application No. PCT/US2019/45499 filed Aug. 7, 2019 and published as: WO/2020/033541 dated Feb. 13, 2020.

International Search Report and Written Opinion dated Apr. 27, 2021 in International Application No. PCT/US2021/17288 filed Feb. 9, 2021.

Non-Final Office Action dated Sep. 14, 2022 in U.S. Appl. No. 16/486,781, filed Aug. 16, 2019, published as: 2020-0008611 on Jan. 9, 2020.

* cited by examiner

| VIBRATION (Range of measure) | Acceleration: m/s*2 (0.01-199.9) | Speed: mm/s (0.01-199.9) | Displacement: mm (0.001-1.999) |
|---|---|---|---|
| | | | |
| High Vibration | 50-60 | 14-55 | 0.5-0.7 |
| | | | |
| Medium Vibration | 18-25 | 13-18 | 0.4-1.0 |
| | | | |
| Low Vibration | 4-9 | 7-8 | 0.08-0.10 |

FIG. 19

FILTER STAND AGITATOR FOR BREWING, STEEPING OR INFUSING A LIQUID

RELATED APPLICATIONS

This application claims priority under 35 U.S.C. section 119(e) from U.S. provisional patent application Ser. No. 62/883,908, filed Aug. 7, 2019, by M. Sjaastad et al., titled "FILTER STAND AGITATOR FOR BREWING, STEEPING OR INFUSING A LIQUID", which is incorporated by reference herein in its entirety.

BACKGROUND

There is a wide and ever increasing variety of consumer products for consumption that may be at least partially processed by the extraction of solid and/or aromatic materials and infusing them into liquids. Coffee and tea are, of course, two of the most common of such products in demand. As consumers of such products have become more familiar with different varieties and qualities of these products, their tastes have become more sophisticated over time and, in many cases, more demanding with regard to the quality and varying properties of such products. Although a variety and quality of raw materials for such brewed or infused products has increased dramatically in the recent past, what has been needed are devices and methods for consumers to control at least some of the properties, tastes and characteristics of such infused products.

SUMMARY

Some embodiments of an agitator for enhancing infusion of a liquid may include a housing base that has a rigid annular configuration, an upper surface, a lower surface which is disposed opposite the upper surface, an interior cavity disposed between the upper surface and the lower surface and an aperture extending from the upper surface to the lower surface. The agitator embodiment may also include a plurality of support extensions which each have a resilient configuration, which each have a lower end secured to the housing base about the aperture, and which each have an upper end that extends in an upward direction from the upper surface. A vibration source may be disposed on and operatively coupled to an upper section of a support extension and a controller may be disposed in operative communication with the vibration source. A power source may also be operatively coupled to the controller.

Some embodiments of a method of infusing a liquid may include disposing a lower surface of a housing base of an agitator onto an upper edge of a cup and engaging an upper ring of a filter basket with upper ends of a plurality of support extensions of the agitator. A solid material may be disposed into an interior volume of the filter basket and liquid added to the solid material in the interior volume of the filter basket to form an infusion mixture. A vibration source which is operatively coupled to an upper section of a support extension may be activated so as to generate and emit vibration energy therefrom and transmit the vibration energy from the upper section of the support extension through the upper ring of the filter basket, through a body of the filter basket and into the infusion mixture which is disposed within the interior volume of the filter basket. Infused liquid falling from the filter basket may be collected into an interior volume of the cup.

Certain embodiments are described further in the following description, examples, claims and drawings. These features of embodiments will become more apparent from the following detailed description when taken in conjunction with the accompanying exemplary drawings.

BRIEF DESCRIPTION OF THE DRAWINGS

FIG. 19 is a table of vibration energy output characteristic embodiments.

The drawings are intended to illustrate certain exemplary embodiments and are not limiting. For clarity and ease of illustration, the drawings may not be made to scale and, in some instances, various aspects may be shown exaggerated or enlarged to facilitate an understanding of particular embodiments.

DETAILED DESCRIPTION

Agitator embodiments discussed herein are configured to emit vibration energy into to an infusion mixture consisting of solid material (which may include one or more types of ground or finely ground particles) immersed in a liquid. The emission of vibration energy may be performed in a controlled manner in order to enhance the extraction of solids, liquids or any desired chemicals or components of the solid material into the liquid of the infusion mixture. For example, a hot or cold brewing process, hot or cold steeping process, or, more generally, a hot or cold infusion process may be enhanced and/or controlled with embodiments of the agitators discussed herein. Such infusion control and enhancement may be used, for example, in the preparation of infused liquids such as coffees, teas, oils, alcoholic beverages including flavored alcoholic beverages and the like. In some cases, the vibration frequency, intensity, pattern, total time period, time schedule, or locality of vibration energy directed into an infusion mixture may be defined and controlled by the user. Vibration energy control may be achieved via a local controller on the device to provide user tunable vibration energy features or by the use of external methods such as a computer program or mobile phone application that provides a wired connection or wirelessly accesses agitator embodiments in order to tune such an infusion process specifically to the user's desired preferences.

Figure 16:
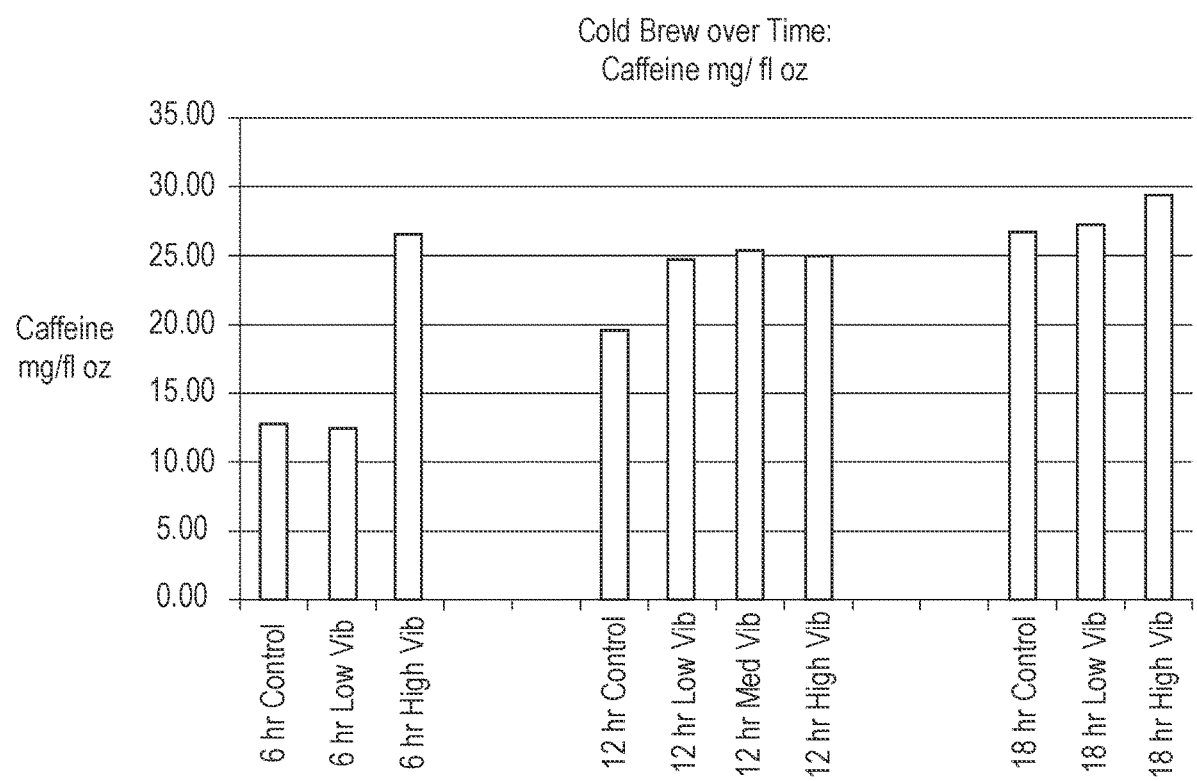
FIG. 16 is a bar graph illustrating caffeine concentration versus brew time and vibration intensity.
Figure 17:
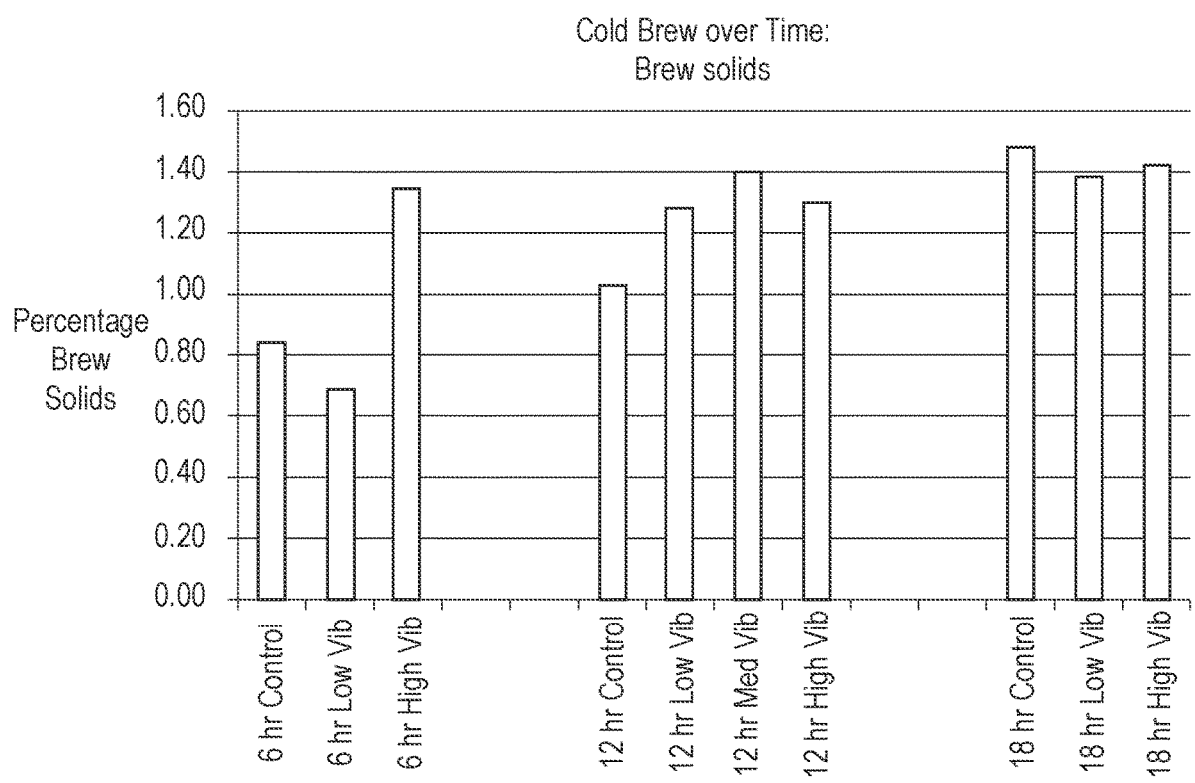
FIG. 17 is a bar graph illustrating a measurement of coffee brew solids versus brew time and vibration intensity.
Figure 18:
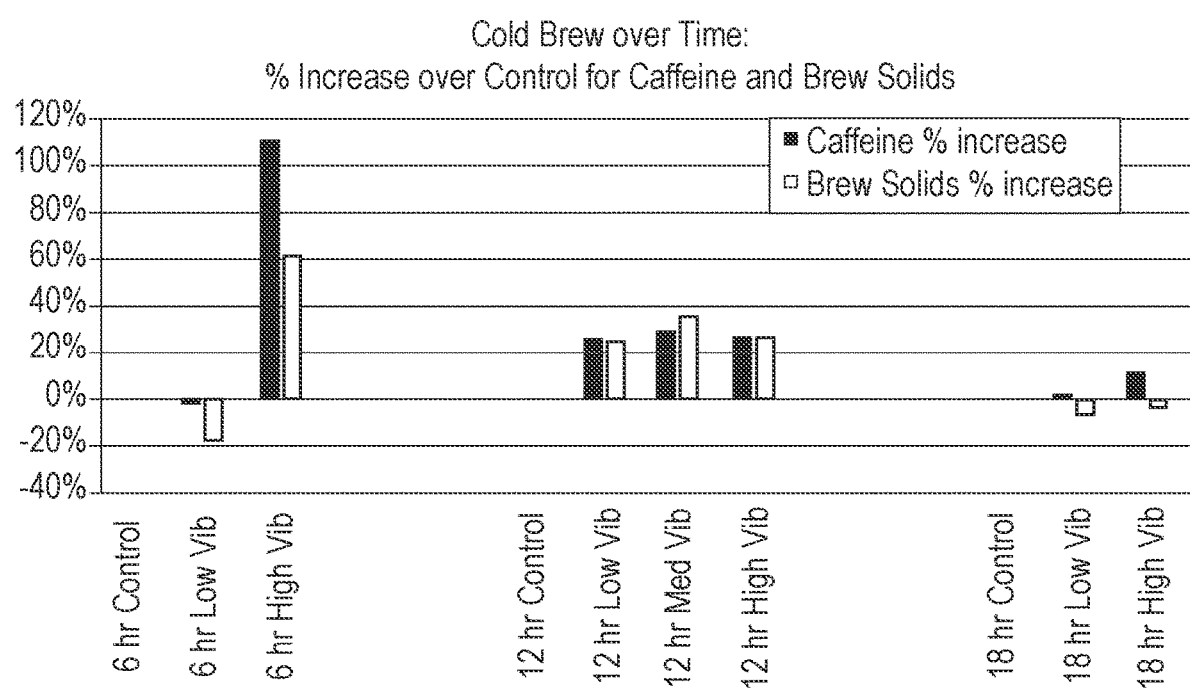
FIG. 18 is a bar graph illustrating a measurement of caffeine concentration and brew solids concentration versus brew time and vibration intensity for a cold brewing process.

It is generally believed by the inventors that the application of certain types and schedules of vibration energy to infusion mixtures may cause agitation, convection, mixing etc. of the solid material relative to the liquid so as to accelerate the infusion of one or more aromatic flavorful materials from the solid material into the liquid that surrounds the solid material so as to create an infused liquid. In addition to the acceleration of the infusion process, the application of certain types of vibration energy may also alter the rate of infusion of one type of extracted component over another so as to allow some selectivity of the infusion of certain components of an infused liquid that results from the infusion process. Examples of such selectivity may be found in the exemplary bar graph data of FIGS. 16-18. Tunability of the infusion process by adjustment of properties of agitation may be used to selectively enhance or ameliorate individual characteristic (composition and flavor) of the resulting infused liquid or beverage. As discussed above, manipulating the characteristics of the vibration energy and the resulting agitation of an infusion mixture may be used for effectively tuning the infusion process for a desired outcome of individual tastes. An example of this is shown in FIG. 16 where a selective increase of caffeine extraction during an 18 hour cold brew coffee preparation was measured relative to other components such as brew solids over time with increasing intensity of agitation. Increasing levels of agitation increased the rate and total amount of caffeine extraction. Importantly, similar concentrations of caffeine were present in 6 hours with high agitation as were present only after 12 or 18 hours of normal cold brew process. This effectively shortens the time required to create a more caffeinated beverage or allow a more caffeinated beverage at any brew duration.

This example demonstrates that caffeine levels can be selectively tuned, and significantly increased at shorter duration on a brew process with particular types of agitation. It also suggests that it is possible to produce a more caffeinated beverage using agitation than without. Similarly, FIG. 17 displays that the percentage of brew solids (a measurement of "strength" of the coffee taste) in the cold brew are increased to a varying degree depending upon intensity of agitation. It may be noted that subjective evaluation of the resulting cold brew coffee in blind taste tests by coffee analysis experts demonstrated that other qualities of coffee such as: flavor, body, aroma, acidity and finish are impacted independently by varying the intensity and duration of agitation (data not shown). Taken together the data of FIGS. 16-18 demonstrates that varying the characteristics of vibration energy and resulting agitation may enable individuals to tune or customize the infusion process to selectively produce a beverage to their composition and taste preferences.

Some agitator embodiments may be integral to the brewing/steeping/infusing system or components thereof (e.g. a vibration source built into the brewing, steeping, or infusion device or equipment) or they may include agitator embodiments that may be used as a platform or may be attached and removed from already existing brewing, steeping or infusing systems. For example, a vibration source with intensity and time controls may be attached to a pour over type filter container or brewing vessel. In addition, a vibration source may be permanently or releasably attached to the outside portion of a cold brewing vessel to provide vibration energy to the water and coffee grounds of the infusion mixture to control and enhance such a brewing process.

Figure 1:
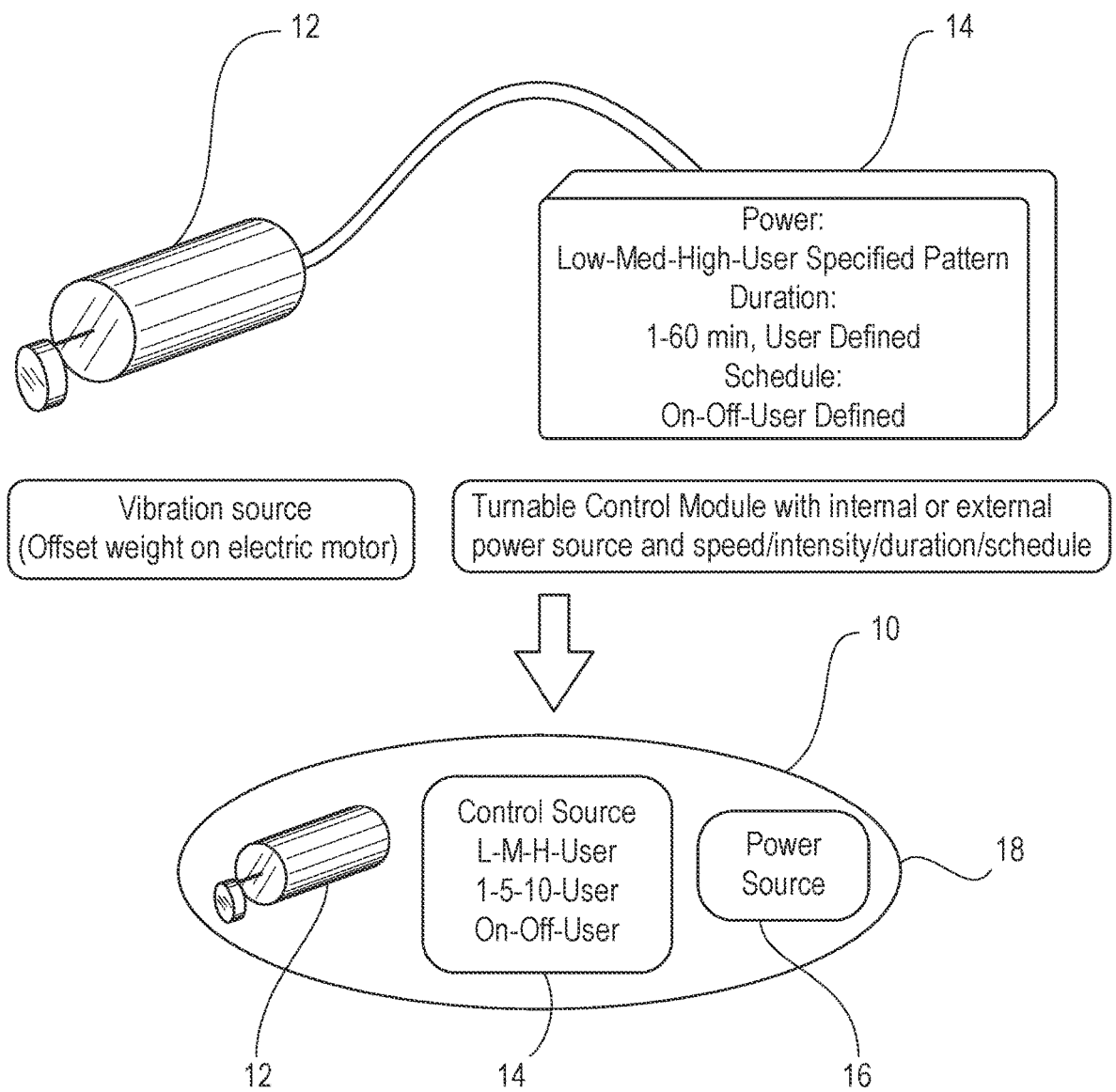
FIG. 1 is a schematic representation of an agitator wherein a vibration source, controller and power source have been combined in a single unit.
Figure 6:
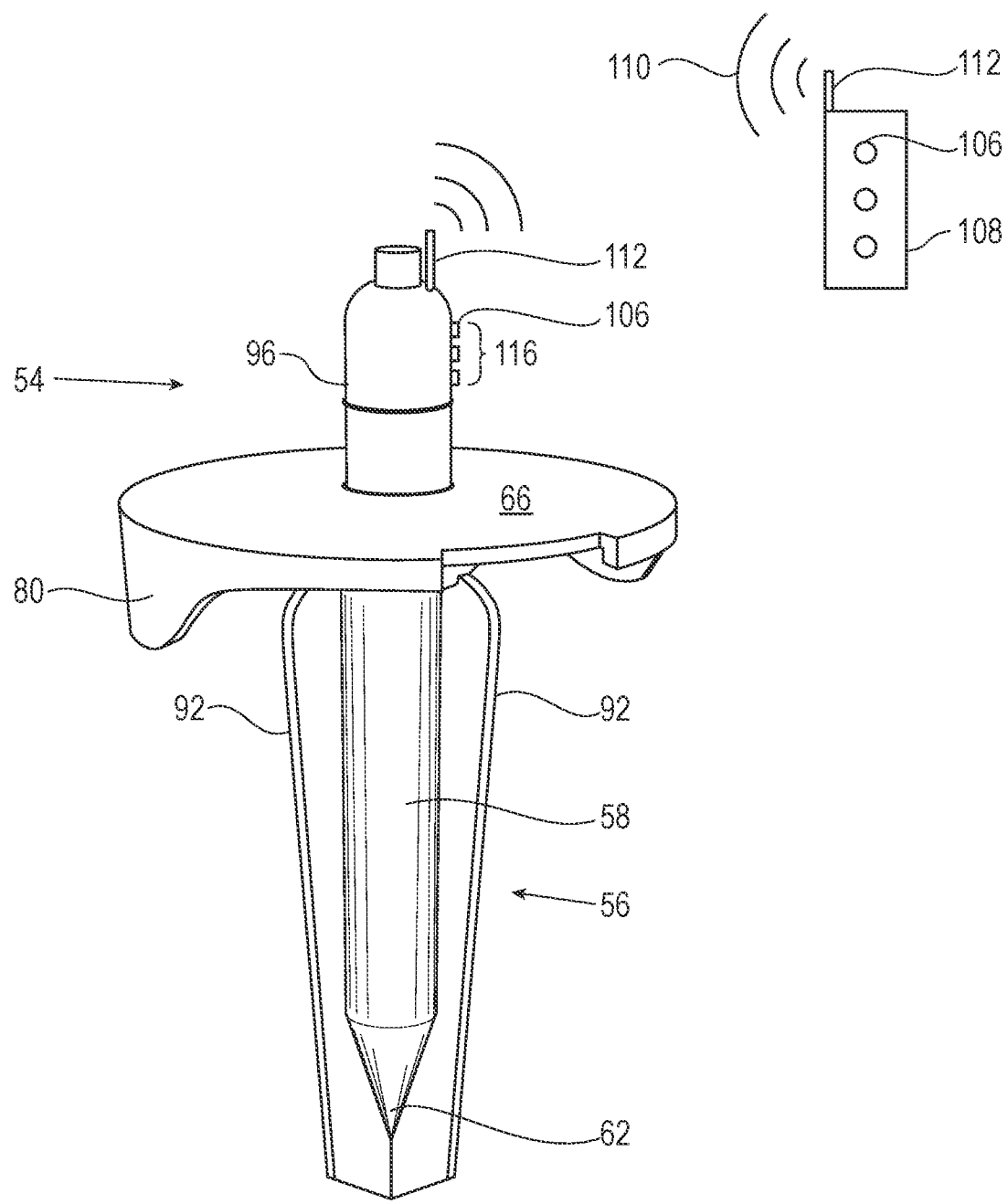
FIG. 6 is a perspective view of an agitator embodiment having a flange and a radiator with an elongate profile that may be inserted into an infusion mixture of a liquid and a solid material for brewing control and enhancement.

With regard to certain exemplary embodiments, FIG. 1 schematically illustrates components of an embodiment of a brewing control device also referred to herein as an agitator 10 that may include user tunable features in some cases. The components of the agitator 10 may include a vibration source 12, which may include an offset weight on a shaft of an electric motor. A control source which is also referred to herein as a controller 14 may be configured to let a user specify the power or intensity of vibration, duration of vibration, vibration schedule etc. as a means of controlling and enhancing the brewing or infusion process. The controller 14 may be embedded in the agitator 10 and controlled by buttons (as shown in the embodiment of FIG. 6) or it may be controlled remotely via a wired connection, or a wireless connection to a mobile application. A power source 16 may include replaceable batteries, rechargeable batteries, or a connection to an external power source.

According to FIG. 1, the vibration source 12, controller 14 and power source 16 may be embodied together in a single inclusive unit or module disposed within or otherwise secured to a housing. In some cases, the power source 16 and controller 14 may be disposed external to but in operative communication with the vibration source 12. Although the vibration source 12 shown includes an offset or out of balance weight that may be rotated by an electric motor in order to produce vibration energy that may be emitted from the vibration source 12, any other suitable form of vibration source 12 may be used. Vibration source embodiments 12 may include any mechanism that is configured to convert electrical energy (or any other suitable form of energy) into vibrational energy. For example, some vibration source embodiments 12 may include piezoelectric vibration sources, solenoid driven vibration sources, voice coil driven vibration sources, bi-metal film driven vibration sources or the like.

Figure 2A:
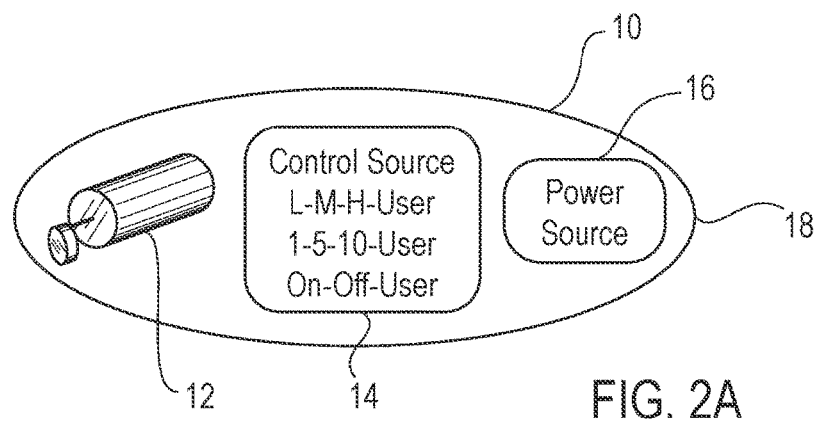
FIG. 2A is a schematic representation of the agitator of FIG. 1.
Figure 2B:
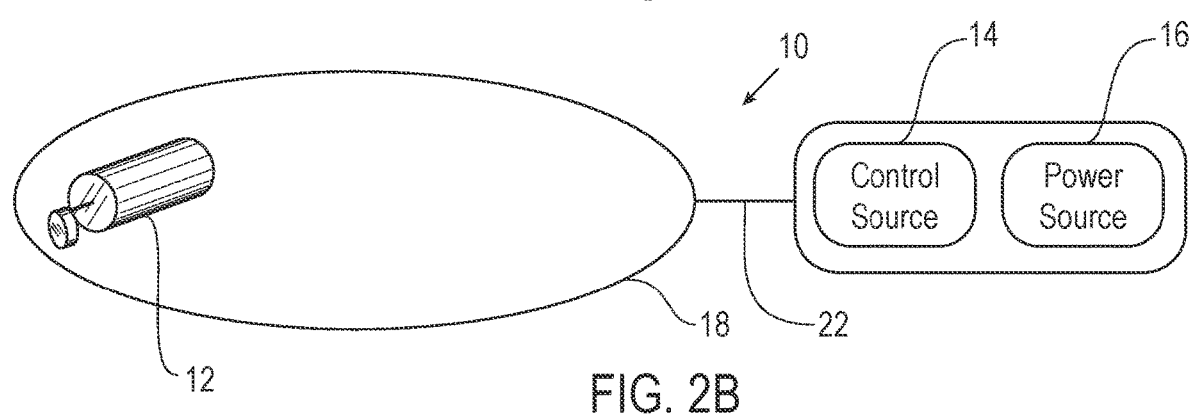
FIG. 2B is a schematic representation of an agitator wherein a vibration source is disposed in a unit separate from but in operative communication with a controller and power source.
Figure 2C:
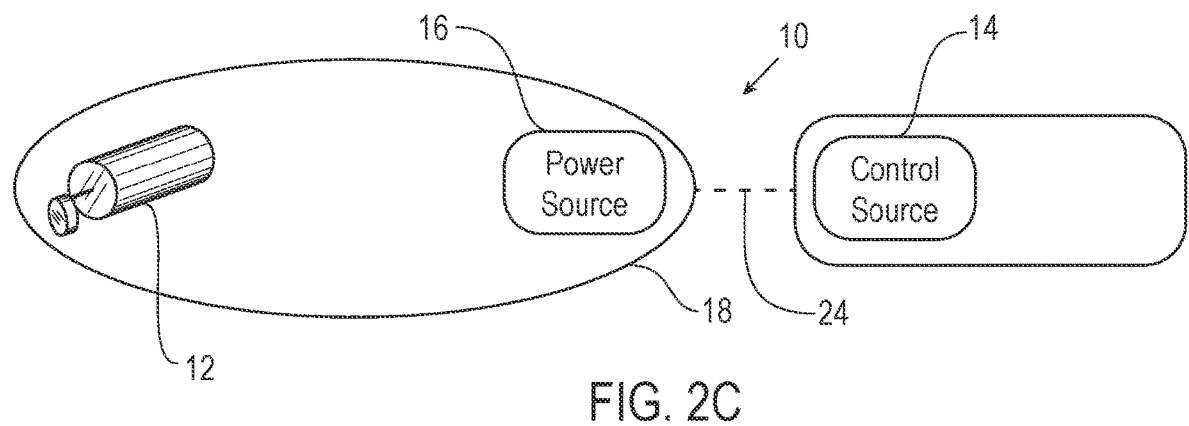
FIG. 2C is a schematic representation of an agitator wherein a vibration source and power source are disposed in a unit separate from but in wireless communication with a controller.
Figure 2D:
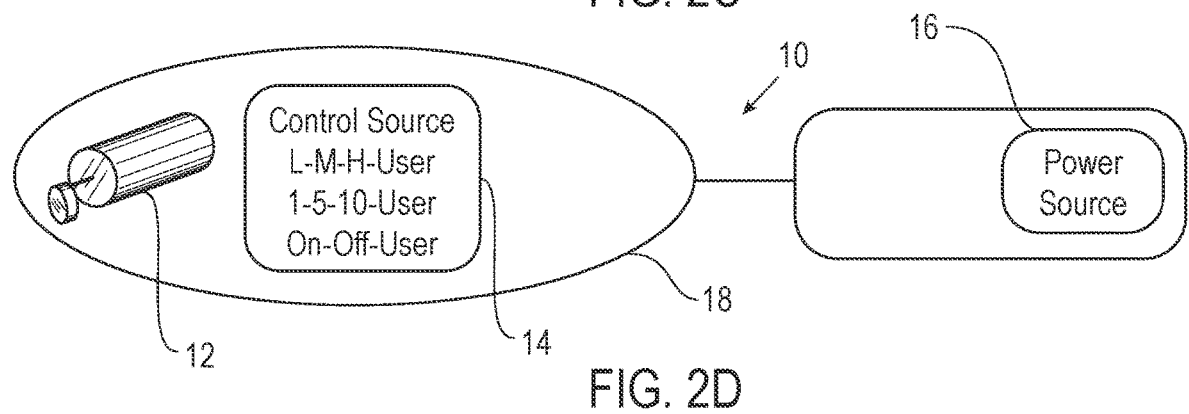
FIG. 2D is a schematic representation of an agitator wherein a vibration source and controller of the agitator are disposed in a unit separate from but in operative communication with a power source.

FIGS. 2A-2D illustrate embodiments of a power source 16, controller 14 and vibration source 12 configuration options for some agitator 10 and method embodiments discussed herein. The controller 14 for the agitator 10 may be disposed within or otherwise secured to a housing 18 with the vibration source 12 as shown in FIGS. 2A and 2D. The controller may also include a wired connection 22 to a separate controller physically separated from the power source and vibration source as shown in FIG. 2B or a wireless connection 24 to a separate controller 14 having a mobile application (such as is typically used on a smart phone) as shown in FIG. 2C. The power source 16 (including either replaceable or rechargeable batteries) may reside on the agitator 10 as shown in FIGS. 2A and 2C or the power source 16 may include an external power source 16 as shown in FIGS. 2B and 2D. Embodiments of such an external power source 16 may plug into a common household wall socket, include one or more batteries (either replaceable or rechargeable) or any other suitable power source. For some embodiments, the vibration source 12 may be attached firmly to the brewing, steeping, or infusion system. The agitator 10 may be self-contained such that built into it is a vibration source 12, controller 14, and power source 16. Alternatively, the agitator 10 may include an external power source attached by wires. Also, the agitator embodiments 10 may have an external controller 14 that is coupled via wires 22 or via a wireless link 24, and the controller 14 may be controlled via a mobile application as discussed above.

Figure 20:
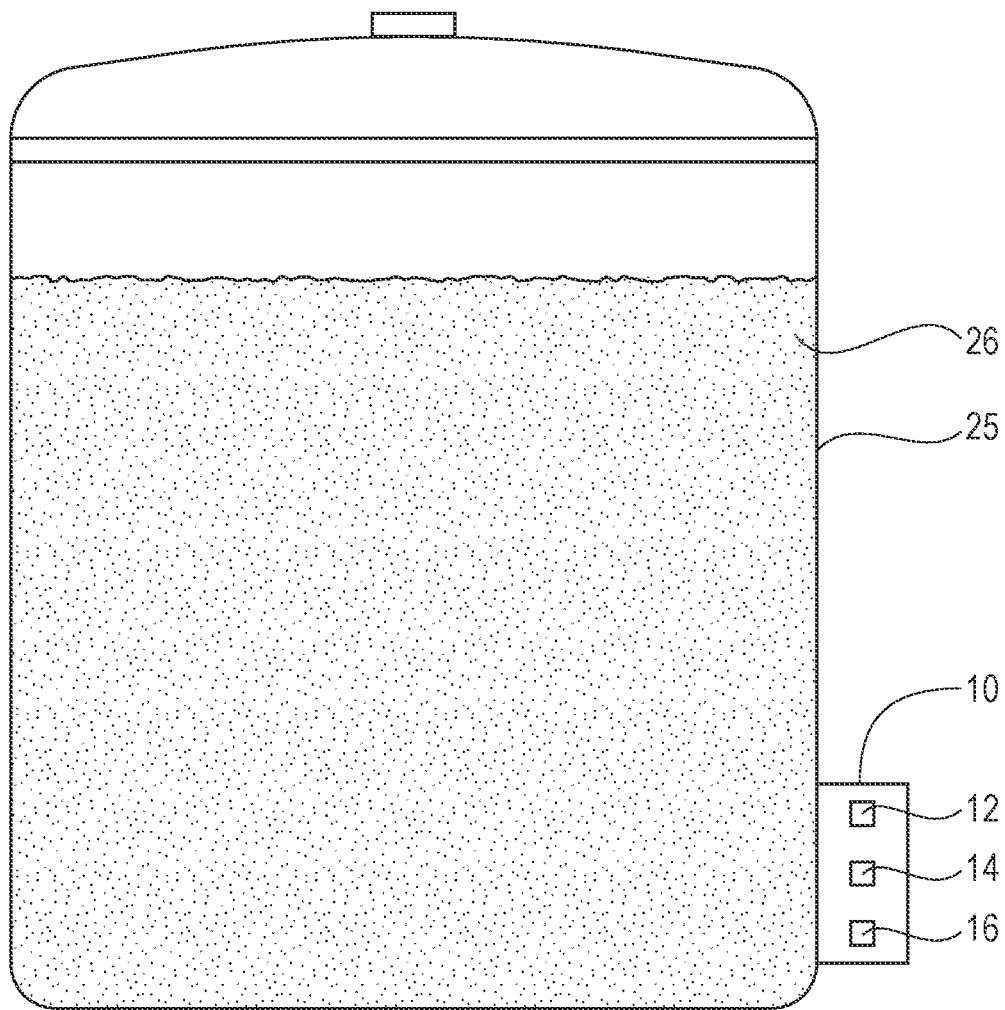
FIG. 20 is an elevation view in section of a large capacity infusion urn.

In many cases, an end user may desire to brew/steep/infuse products to their personal desired specifications based on enhancement and control of the process through tunable vibration energy being coupled to their own existing brewing system. To do this on a fully self-contained agitator embodiment 10, the user may first attach the agitator embodiment 10 to the user's brewing vessel to which they want to apply tunable vibration energy. The user may then select the buttons to control all available vibration energy variables. These variables may include vibration intensity, vibration duration and vibration pattern or schedule. In some cases, embodiments may include any method in which user tunable vibration is applied to the brewing, steeping or infusing process. Also, the agitator 10 and method embodiments discussed herein may be built into commercial products (such as the high volume urn 25 shown in FIG. 20) or may be configured as removable devices that may be releasably and operatively secured to a user's existing brewing system or components thereof.

As shown in the agitator embodiments 10 illustrated in FIGS. 1-2D and discussed above, some controller embodiments 14 may be configured to set a power level of vibration energy applied to an infusion mixture 26 (shown in FIGS. 5B-5C) at a plurality of different power levels. For example, the vibration energy power level may be set to a low, medium or high power level setting by a user. In addition, for the embodiment 10 shown in FIGS. 1-2D, the duration time over which vibration energy is generated by and emitted from the vibration source may be set to a time from about 1 minute to about 60 minutes (as shown in FIG. 1), in some cases. The user, in some instances, may set the duration of operation of the vibration source to a pre-selected time period chosen from a menu of pre-selected time periods, such as a pre-selected time period of 1 minute, 5 minutes, 10 minutes or any other suitable pre-selected time period (as shown in FIG. 1). The controller may also be configured to provide "on-off" control of the vibration source to the user. In addition, the characteristics of the vibration energy produced by and emitted from the vibration source may be tuned or selected by a user. As shown in the chart 27 of FIG. 19, some vibration source embodiments 12 may be configured to produce vibration energy having a vibration acceleration of about 0.01 m/s2 to about 200 m/s2, a vibration speed of about 0.01 mm/s to about 200 mm/s, and a vibration displacement of about 0.001 mm to about 2 mm. In addition, some vibration source embodiments 12 may be configured to produce vibration having a vibration acceleration of about 4 m/s2 to about 60 m/s2, a vibration speed of about 7 mm/s to about 55 mm/s, and a vibration displacement of about 0.08 mm to about 0.7 mm. Any of the vibration source embodiments may be configured to produce vibration energy having any suitable combination of parameter values shown in the chart 27 of FIG. 19. In addition, any of the vibration source embodiments discussed herein may be configured to emit vibration energy having any other suitable parameters including ultrasonic vibration energy, low frequency energy of about 1 Hz to 60 Hz or any suitable frequency in between ultrasonic and low frequency.

Figure 3A:
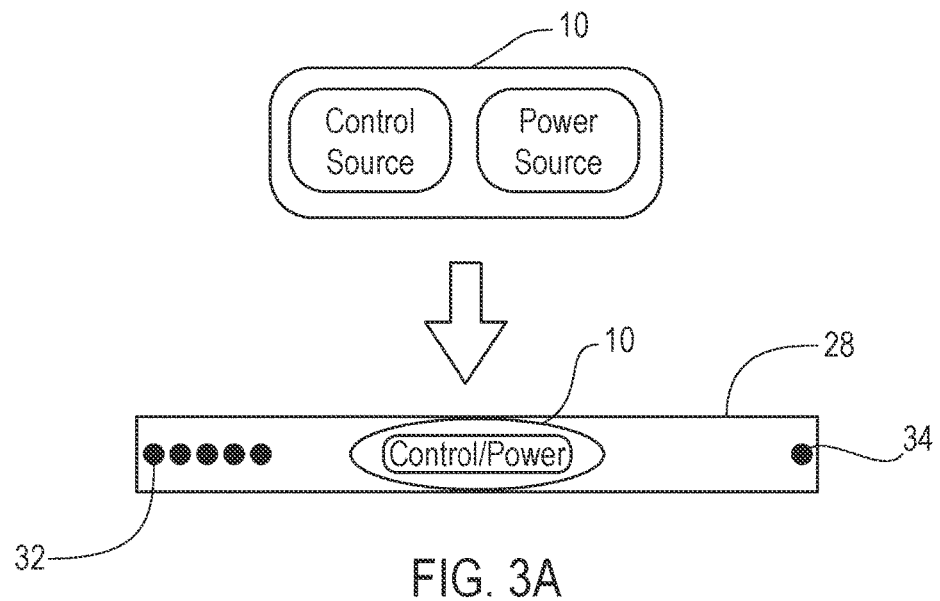
FIG. 3A is a schematic representation of an agitator embodiment secured to an adjustable elastic band.
Figure 3B:
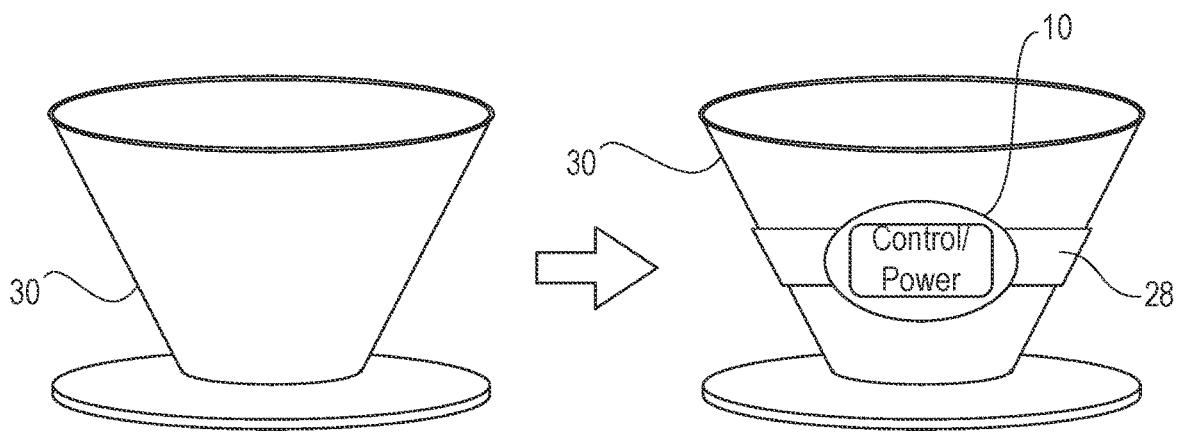
FIG. 3B is a schematic representation of an agitator embodiment as shown in FIG. 3A releasably secured to a brewing vessel in either a horizontal or vertical type orientation.
Figure 3B:
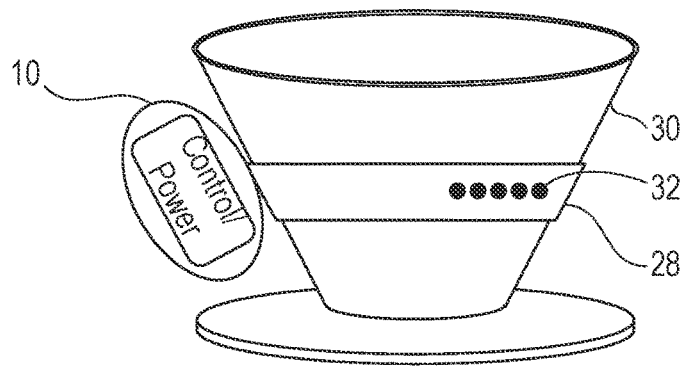

FIGS. 3A and 3B illustrate embodiments of an agitator 10 which includes a power source 16, controller 14 and vibration source 12 (not shown) and which may have any of the suitable features, dimensions or materials of other agitator embodiments discussed herein. The agitator 10 may be secured to a band, such as an adjustable elastic silicone band 28 (or any other suitable type of band) in which the band may be removably and operatively secured to a brewing system or components thereof such that vibration energy may be transferred to an infusion mixture in the brewing system to enhance a process of brewing, steeping, or infusing the infusion mixture to produce a desired infused liquid. In some cases, such embodiments may be used for applying vibration energy to a pour over type filter container 30 of a brewing system. In this example, the adjustable band 28 may be used that has holes 32 through a section of the band 28 along one end of the band similar to a wristwatch band. A raised grooved knob 34 is disposed on an end of the band 28 which is opposite that of the holes 32 as shown in FIG. 3A. For such a configuration, it may be desirable for the through holes 32 to be sized slightly smaller than an outer transverse dimension of the raised grooved knob 34 such that a hole 32 may be elastically enlarged and placed over the knob 34 to ensure a secure fit attachment that may be subsequently released by lifting the band 28 adjacent the knob 34 in a radially outward direction and pulling the band 28 off the knob 34. Also, the agitator 10 may be mounted vertically or horizontally on the band 28 as shown in FIG. 3B. The agitator 10 may also be removed from the band 28 in some instances if desired.

Figure 4A:
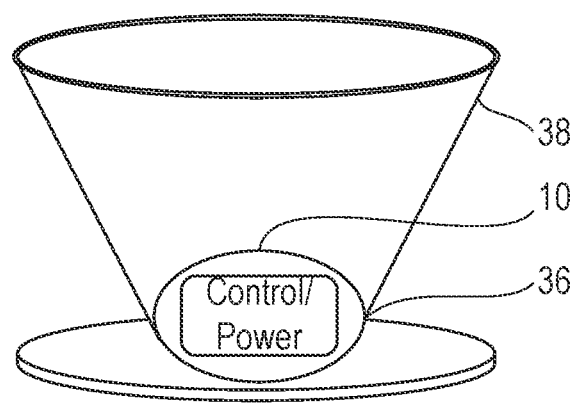
FIG. 4A is a schematic representation of an agitator embodiment built into a base of a pour over type filter container.
Figure 4B:
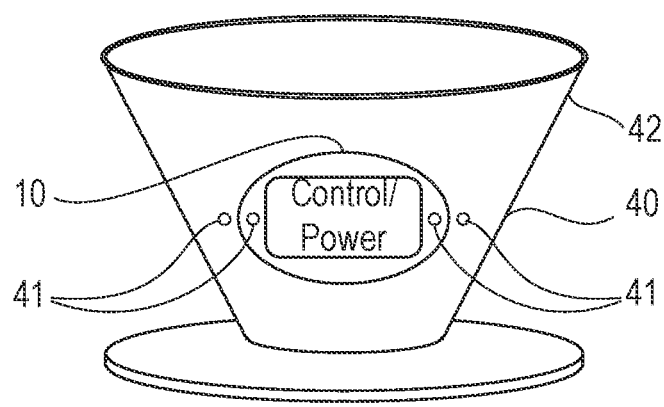
FIG. 4B is a schematic representation of an agitator embodiment which is releasably secured to a pour over type filter container using magnets.
Figure 4C:
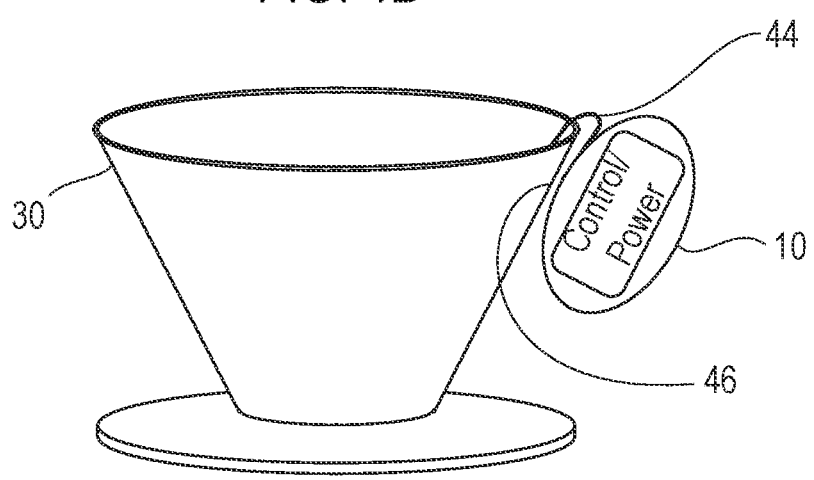
FIG. 4C is a schematic representation of an agitator embodiment which is releasably secured to a pour over type filter container using a clip attachment.

FIG. 4A illustrates an attachment method embodiment wherein an agitator 10 is built into a base 36 of a pour over filter container or vessel 30. FIG. 4B illustrates an attachment method embodiment wherein magnets 41 are included in a wall 40 of a pour over type filter container of a brewing system. Magnets 41 may also be included on a corresponding agitator 10 such that there is a releasable magnetic attachment between the wall 40 of the pour over type filter container 42 and the agitator 10 when in close proximity with each other. An additional example of an attachment embodiment includes an agitator 10 having a clip attachment 44 (the clip attachment may include an alligator type clip in some cases) such that the agitator 10 may be releasably secured to an upper wall 46 of a pour over type filter container 30 (or any other suitable container or vessel of a brewing system or the like) as shown in FIG. 4C. For each of the embodiments shown in FIGS. 4A-4C, it may be desirable for the vibration source 12 (not shown) of each of the respective embodiments to mechanically couple to the wall of the pour over type filter container so as to effectively transfer vibration energy from the vibration source 12 to the wall of the pour over type filter container and the interior volume thereof and any infusion mixture 26 contained therein.

Figures 5A, 5B, 5C:
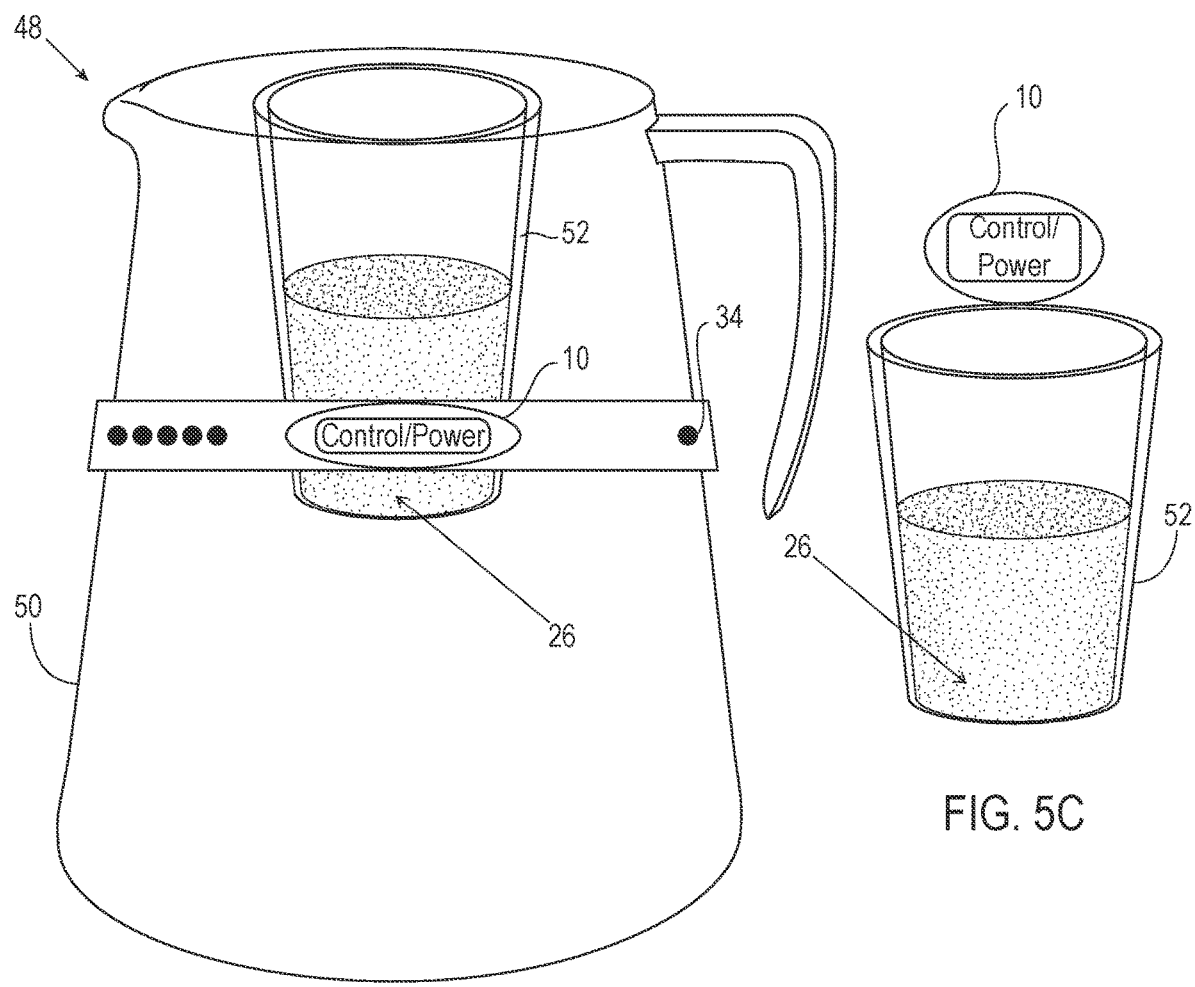
FIG. 5A is a schematic representation of an agitator embodiment including an adjustable elastic band.
FIG. 5B is a schematic representation of the agitator embodiment of FIG. 5A with the adjustable elastic band releasably secured to a cold brew brewing vessel.
FIG. 5C is a schematic representation of the agitator embodiment of FIG. 5A operatively coupled to a brewing filter container.

FIGS. 5A-5C illustrate embodiments of the implementation of cold brew processes for beverages such as coffee, tea or the like using an attachment accessory such as the adjustable band 28 discussed above or any other suitable adjustable band. As shown in FIG. 5A, some agitator embodiments 10 may include an adjustable band 28 which may be configured to be releasably and operatively secured to a brewing system (or component thereof) including a cold brewing system 48. In some cases, the agitator embodiment 10 may be secured to an outside surface of a cold brewing vessel 50 of a brewing system 48 (or other suitable vessel) as shown in FIG. 5B or secured to a filter container 52 of such a cold brewing system 48 as shown in FIG. 5C. In some cases, the agitator 10 may be secured to commercially available cold brewing systems 48 or incorporated into a cold brewing system as part of the components of such a fully integrated cold brewing system 48. In addition, embodiments of the agitator 10 may be part of the filter apparatus such as the filter container 52 or removably attached to the cold brewing vessel 50 (such as a carafe) itself.

In any of the arrangements discussed with regard to FIGS. 5A-5C, the vibration source 12 of the agitator 10 may be operatively coupled to the infusion mixture 26 such as coffee grounds, tea grounds or the like disposed within the filter container 52 or brewing vessel 50 with water or any other suitable liquid so as to effectively transmit vibration energy from the vibration source to the infusion mixture 26 and effectively agitate the infusion mixture 26 so as to control and enhance the infusion process. Examples of infusion process control and enhancement may be illustrated in some cases by the bar graph data shown in FIGS. 16-18. Such an arrangement as shown in FIGS. 5A-5C may allow a retrofit to existing methods or development of a fully integrated brewing system 48. Similarly, this may be used for steeping tea, infusing oils or alcoholic beverages as well as other materials.

In some cases, it may be desirable to have an agitator 10 that is configured for use with existing brewing systems while directly contacting and coupling vibration energy to an infusion mixture 26 disposed within the existing brewing system 48. For example, FIGS. 6-12, show an agitator 54 for enhancing infusion of a liquid that includes a radiator 56 having a radiator body 58 with an elongate outer contour, a proximal end 60, a distal end 62 and a longitudinal axis 64. The agitator 54 may further include a flange 66 secured to the radiator 56 adjacent the proximal end 60 of the radiator body 58. The flange 66 may include a tubular extension 59 extending distally from a center portion or any other suitable portion of the flange 66, the tubular extension being configured to secure the proximal end 60 of the radiator body 58 to the flange 66. In some cases, the outside surface of the proximal end 60 of the radiator body 58 may have threads that couple to inner threads of an inner surface of the tubular extension 59 of the flange 66. In addition to the threaded coupling, any other suitable method may also be used to secure the proximal end 60 of the radiator body 58 to the flange including adhesive bonding, welding, unity of construction in a monolithic structure etc. In some cases, the flange may be disposed lying transverse to and extending axially from the longitudinal axis 64 of the radiator body 58. As shown in the agitator embodiment of FIGS. 6-12, a vibration source 12 (including an electronic motor 68 coupled to an offset weight 70 by a shaft 72) may be operatively coupled to the radiator body 58 and a power source 16 (including two rechargeable batteries 74) operatively coupled to the vibration source 12. In addition, a controller 14 may be disposed in operative communication with the vibration source 12 in order to send a control signal to the vibration source 12 in order to emit vibration energy having characteristics as specified by a user.

Figure 7:
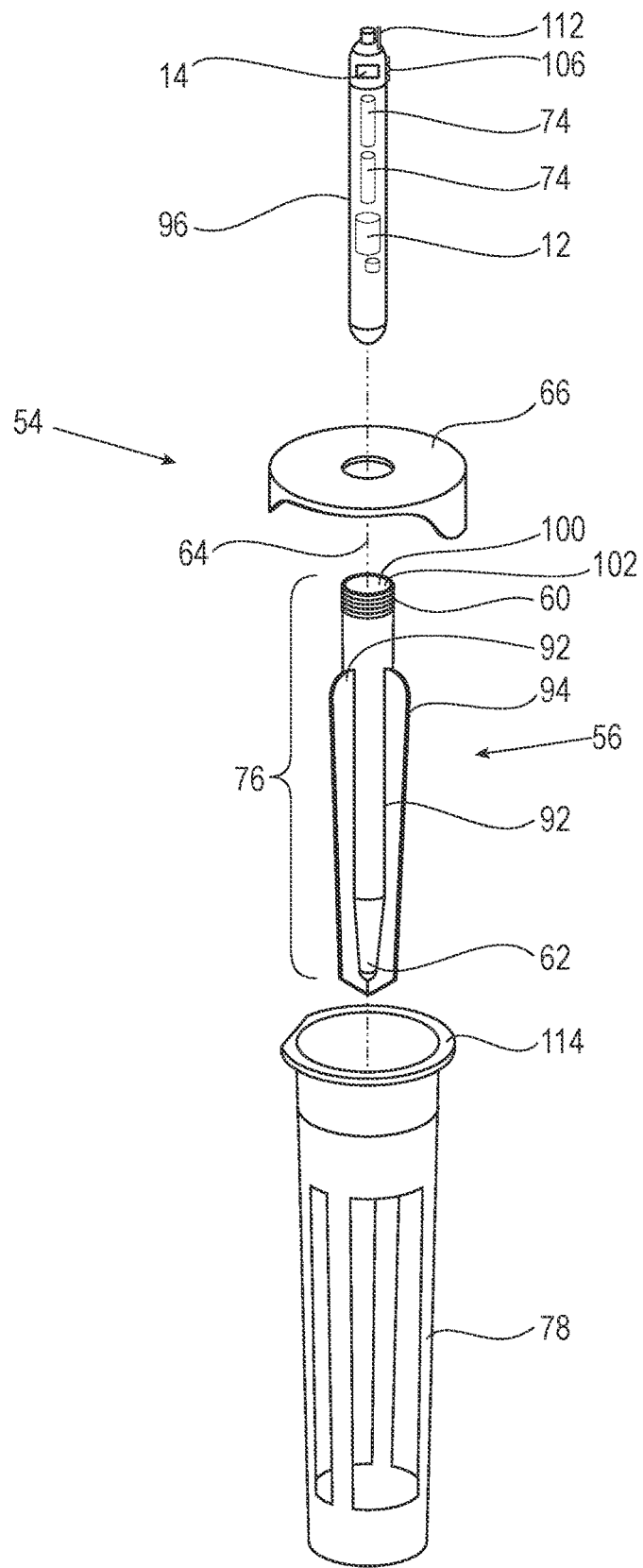
FIG. 7 is an exploded view of the agitator embodiment of FIG. 6 and further including a filter container into which the radiator of the agitator may be inserted during operation.
Figure 8:
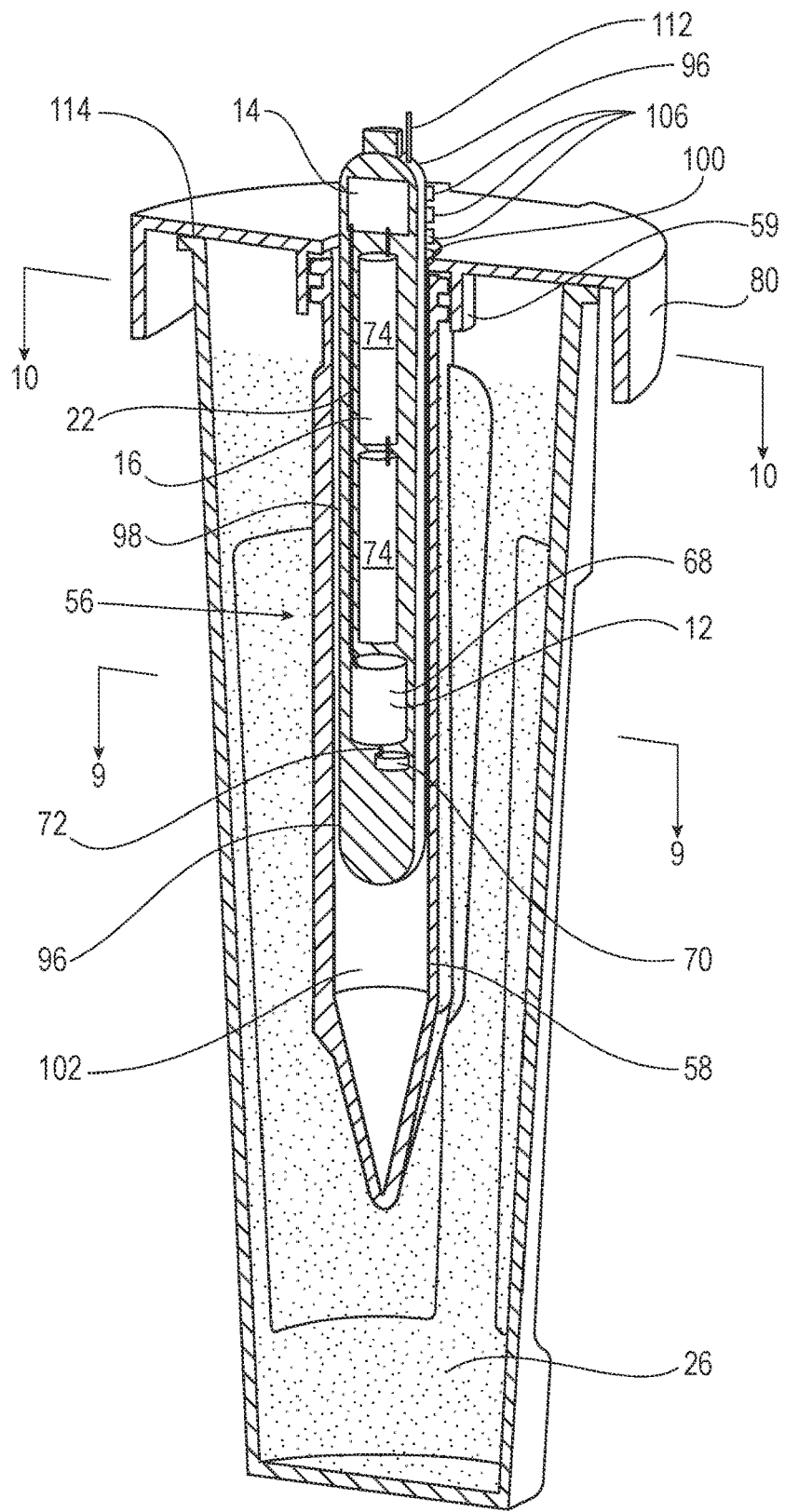
FIG. 8 is a perspective view in longitudinal section of the agitator of FIG. 7 with the radiator thereof disposed within an interior volume of the filter container.
Figure 9:
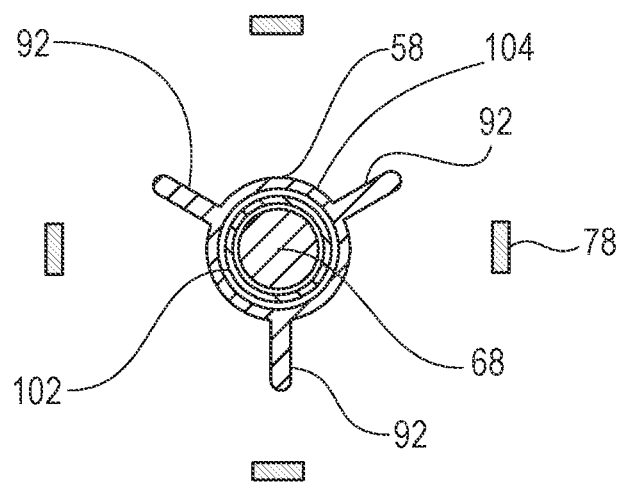
FIG. 9 is a transverse cross section view of the agitator and filter container of FIG. 8 taken along lines 9-9 of FIG. 8.
Figure 10:
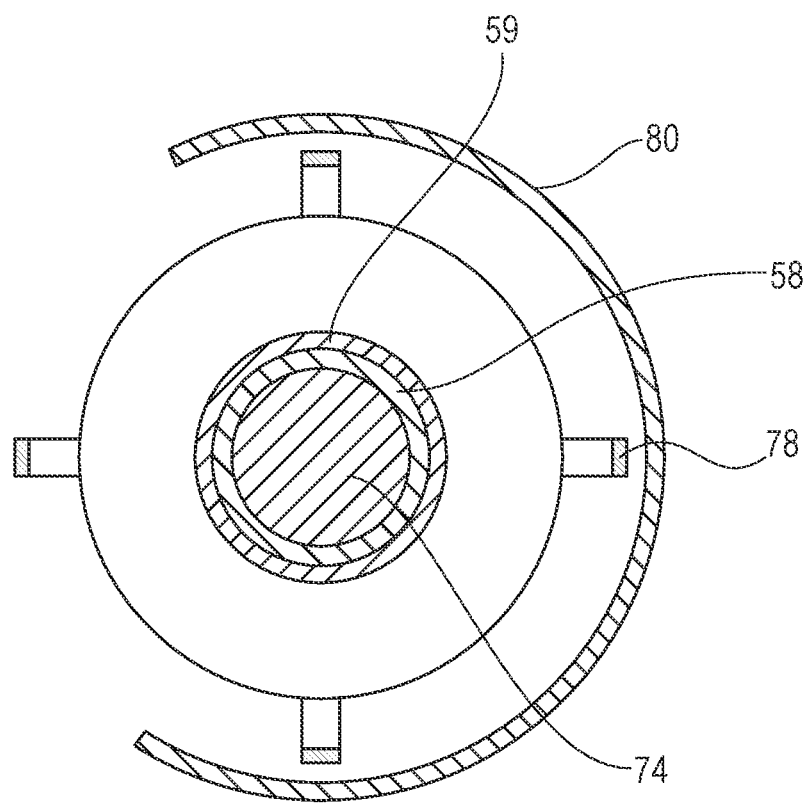
FIG. 10 is a transverse cross section view of the agitator and filter container of FIG. 8 taken along lines 10-10 of FIG. 8.

It may be desirable for an axial length 76 of the radiator body 58 as shown in FIG. 7 to be sufficient for the radiator body 58 to be disposed within the infusion mixture 26 disposed in the brewing system as shown in FIG. 8. In some cases, the axial length 76 of the radiator body is about 10 cm to about 50 cm. In addition, given the working environment of the agitator 54, it may also be desirable for a material of the radiator body to be liquid impermeable and thus the entire radiator body itself to be liquid impermeable. Suitable materials for the radiator body 58 and flange 66 may include polymers such as polycarbonate, ABS, silicone or the like, or metals such as stainless steel, copper or the like.

As shown in the embodiment 54 of FIGS. 6-12, the flange 66 is substantially planar and disposed substantially perpendicular to the longitudinal axis 64 of the radiator body 58. The flange 66 is sized to cover an upper opening of a filter container 78 of a brewing system into which the radiator 56 is to be inserted during an infusion process. In some cases, a transverse dimension of the flange 66 may be at least as great as a transverse outer dimension of an upper opening of a filter container 78 of a brewing system. In addition, some flange embodiments 66 further include a lip 80 secured to and extending distally from the flange 66. Such a lip 80 may have a transverse dimension or span sufficient to cover a transverse outer dimension of an upper opening of a filter container 78 into which the radiator 56 is to be inserted during an infusion process.

Figure 13:
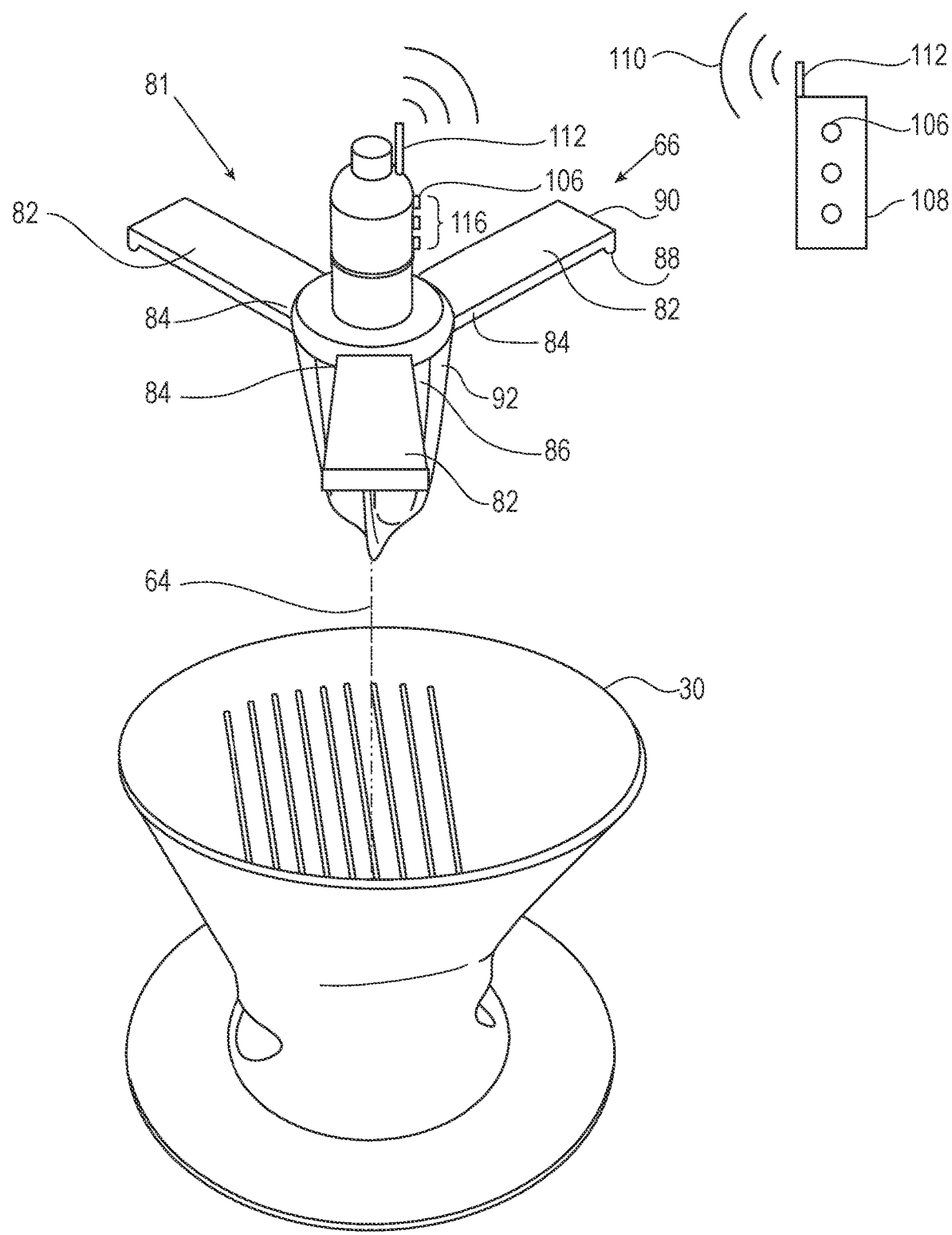
FIG. 13 is an exploded view of an agitator embodiment having a plurality of radial extensions and a pour over type filter container.
Figure 14:
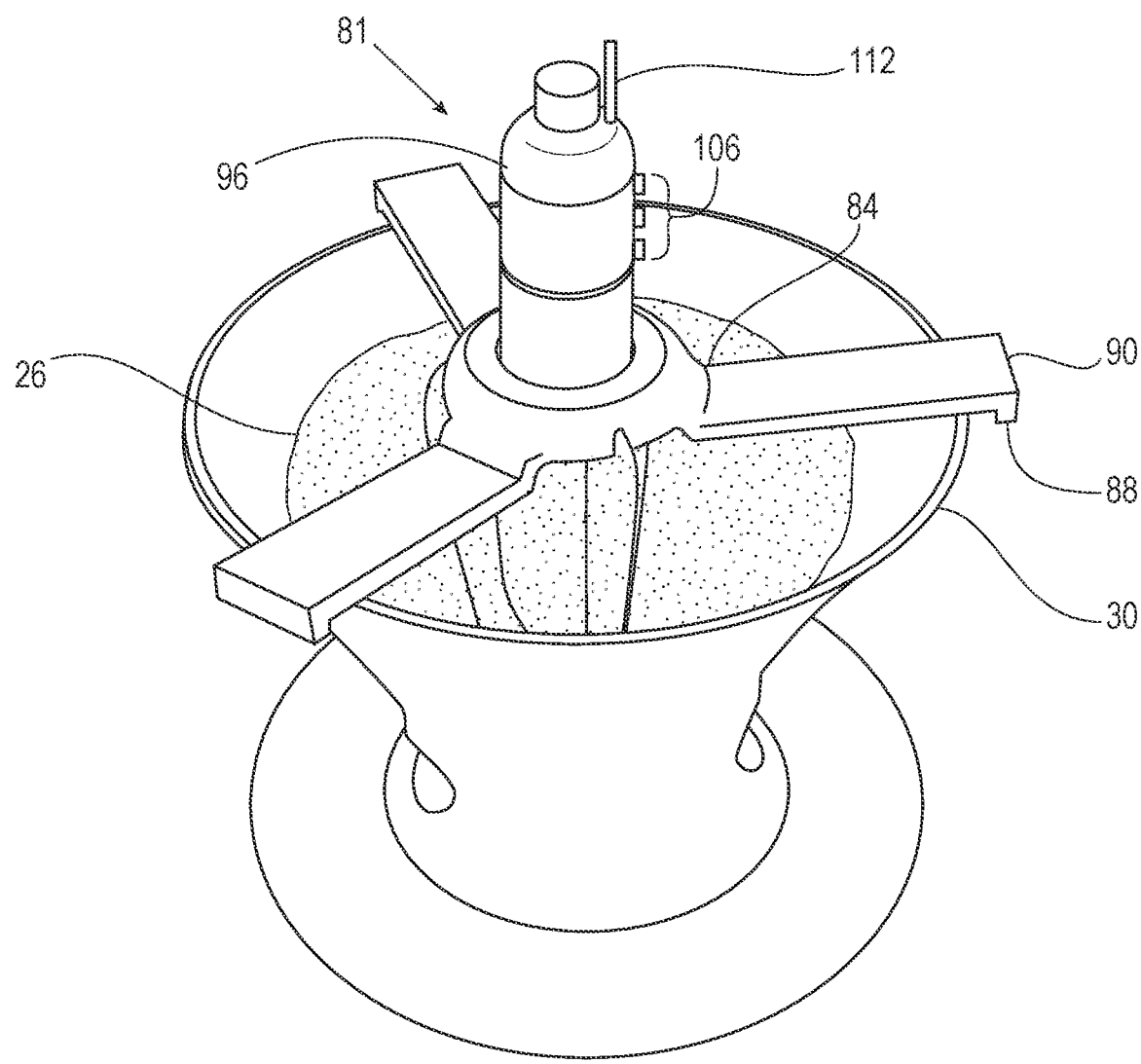
FIG. 14 is a perspective view of the agitator embodiment of FIG. 13 having a plurality of radial extensions and with the radiator disposed within an interior volume of a pour over type filter container with the plurality of radial extensions in contact with an upper rim of the pour over type filter container.

In some agitator embodiments 81, as shown in FIGS. 13-14, the flange 66 may include a plurality of radial extensions 82. Such radial extensions 82 may be resiliently rigid and have an inner end 84 secured to the radiator body 56 and extend radially outward therefrom. The plurality of rigid radial extensions 82 may be substantially perpendicular to the longitudinal axis 64 of the radiator body 86 as shown, but may have other suitable configurations in other cases.

The radial extensions may also include a lip 88 that extends distally from an outward end 90 of one or more of the radial extensions 82. The agitator embodiment 81 shown in FIGS. 13 and 14 may include some or all of the features, dimensions or materials as those of the agitator embodiment 54 shown in FIGS. 6-12. However, the agitator 81 of FIGS. 13 and 14 is generally configured to have a radiator body 86 that is shorter in axial length than the radiator body 58 of agitator 54. Such a shorter configuration may be useful for engaging an infusion mixture 26 disposed within a pour over type filter container 30 as opposed to a cold brew type filter container 78. For some embodiments, the axial length of the radiator body 86 of the agitator 81 may be about 5 cm to about 12 cm, more specifically, about 6 cm to about 10 cm. It should also be noted that the radial extensions 82 of the agitator embodiment 81 in FIGS. 13 and 14 and their associated structures may also be used in place of the flange 66 and its associated structures in the agitator embodiment of FIGS. 6-12, and vice versa.

In some cases, it may be useful to include additional planar type surfaces extending from the radiator 56 in order to more efficiently couple emitted vibration energy from the vibration source 12 to the infusion mixture 26 disposed about the radiator 56. As such, one or more elongate fins 92 may be secured to and extend radially from the radiator body 58. As illustrated in the embodiment of FIGS. 6-14, the fins 92 are substantially planar, evenly spaced about a circumference of the radiator 56, and extend longitudinally parallel to the longitudinal axis 64 of the radiator body 56. For some embodiments, a dimension of a radial extension of the fins 92 from a nominal surface 104 of the radiator body 56 to an outer extremity 94 of the fins 92 may be about 5 mm to about 50 mm.

In some instances, in order to effectively service or clean the agitator 54, and particularly the radiator body 56, it may be desirable to have the option of easily removing the electrical components, including the vibration source 12, power source 16 and controller 14 from the radiator body 56. As such, for some embodiments, the vibration source 12, power source 16 and controller 14 may be disposed within an enclosure 96 which has an outside surface 98 that is sized so as to be removably inserted into a proximal opening 100 of a lumen of the radiator. Once the enclosure 96 is so inserted, the vibration source 12 may be in operative communication with the radiator 56 so as to effectively couple vibration energy emitted from the vibration source 12 to an outside surface 104 of the radiator 56.

In order for a user of either the agitator embodiment 54 or the agitator embodiment 81 to effectively achieve a desired enhancement and control of an infusion process, the controller 14 of the agitator 54 may include a variety of features that allow the user to customize delivery of vibration energy to the infusion mixture of the user's choice. Generally speaking, for the agitator embodiment 54 and the agitator embodiment 81 shown in FIGS. 6-14, the power source 16 may be in operative communication with the controller 14, the vibration source 12 or both the controller 14 and vibration source 12. In some cases, the controller 14 may be configured to control the vibration energy duration, vibration energy intensity, vibration energy displacement, and/or frequency of emitted vibration energy. In addition, the controller 14 may be configured to produce intermittent vibration over a scheduled time period or multiple time periods or a schedule of vibration energy delivery generally. In order for a user to enter the desired vibration energy parameter, the controller 14 may include one or more user interface buttons 106 configured to adjust vibration energy parameters.

In some instances, the controller may be configured for a user to use at least one of the interface buttons 106 to select a vibration energy power level from pre-selected levels or a range of vibration energy power, including low power, medium power and high power, for example. In addition, the controller may be configured for a user to select a duration of vibration energy emission using one or more of the interface buttons 106 for a time of between 1 minute and 60 minutes for some embodiments. For some embodiments, the controller may be configured for a user to use one or more of the interface buttons 106 to select a duration of vibration energy emission from a pre-selected menu of vibration energy durations including 1 minute, 5 minutes and 10 minutes, or any other suitable pre-selected duration value. One or more of the interface buttons 106 may further be used to select a time schedule, such as an intermittent time schedule for the emission of vibration energy from the agitator 54 or agitator 81 to an infusion mixture 26 in contact with the agitator 54 or agitator 81.

For convenient control and use, the controller 14 of some agitator embodiments 54 or 81 may be configured to be in wireless communication with a remote controller 108. For example, in some cases, such a remote controller 108 may include a smart phone application that a user may install on their existing equipment if so desired. In other cases, the remote controller 108 may include a separate wireless controller. Such a remote controller 108 may emit a control signal 110 that includes vibration energy emission information to the controller 14 disposed adjacent the vibration source 12, which in some cases may be referred to as the "primary" controller 14. For such embodiments, both the primary controller 14 and remote controller 108 may include a signal emitter, such as an antenna 112, in order to communicate their respective signals to each other.

In order to provide a desired level of infusion enhancement and control, it may be useful for some vibration source embodiments to emit vibration energy having particular characteristics. For some embodiments, the vibration source 12 may be configured to produce vibration energy having a vibration acceleration of about 0.01 m/s2 to about 200 m/s2, a vibration speed of about 0.01 mm/s to about 200 mm/s, and a vibration displacement of about 0.001 mm to about 2 mm. Furthermore, in some cases, the vibration source 12 may be configured to produce vibration energy having a vibration acceleration of about 4 m/s2 to about 60 m/s2, a vibration speed of about 7 mm/s to about 55 mm/s, and a vibration displacement of about 0.08 mm to about 0.7 mm. For such embodiments, the controller 14 may be configured to provide a control signal 110 to the vibration source 12 to emit vibration energy having any of these vibration energy parameters. Vibration energy parameters such as these are also shown in the chart of FIG. 19 and controller embodiments 14 may be configured to produce any combination of the vibration energy parameters shown in the chart of FIG. 19 or any other suitable vibration energy parameters.

Figure 11:
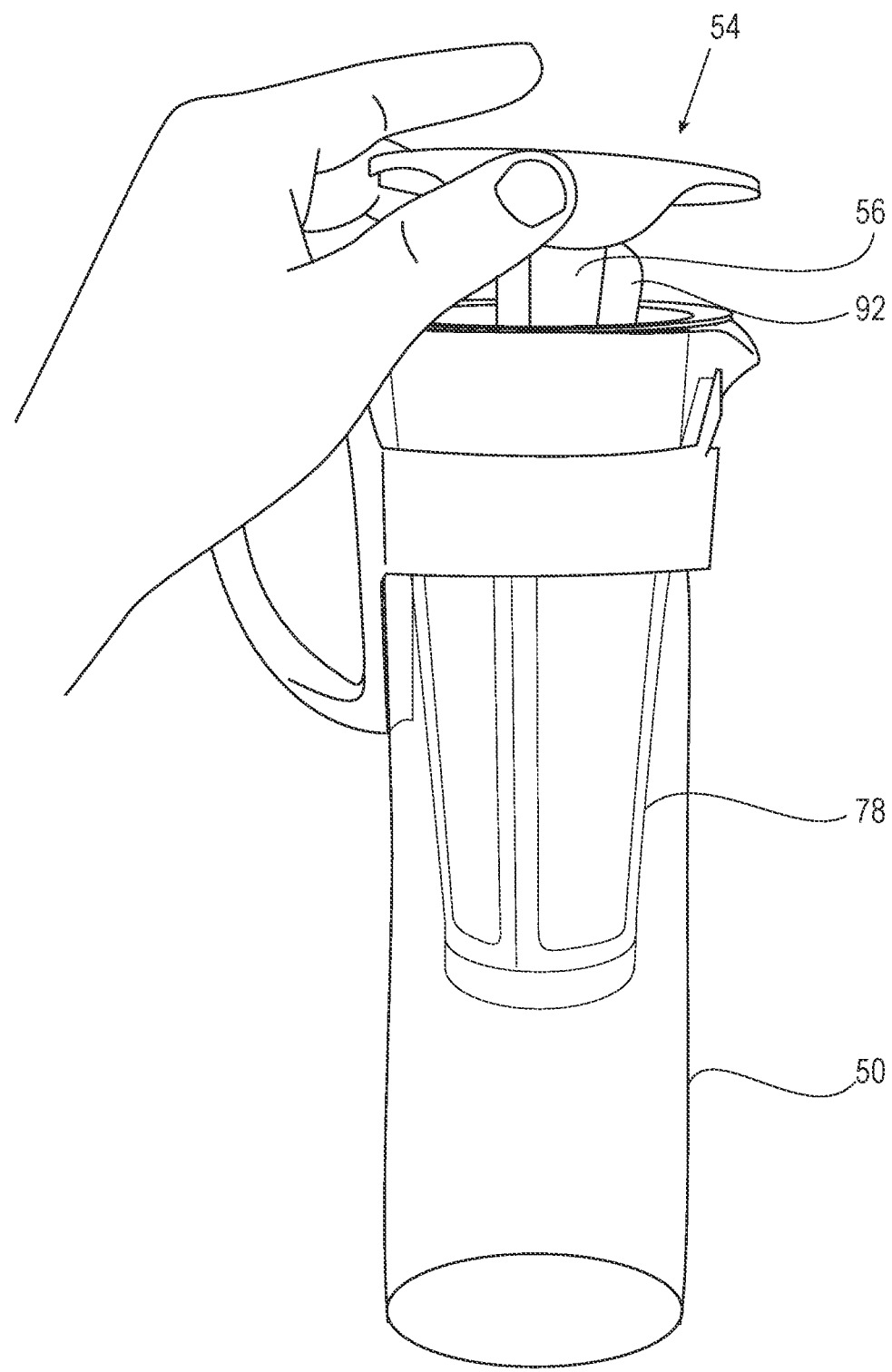
FIG. 11 is an elevation view of the agitator of FIG. 7 being inserted by a user into a filter container which is, in turn, disposed within an interior volume of a brewing vessel of a cold brewing system embodiment.
Figure 12:
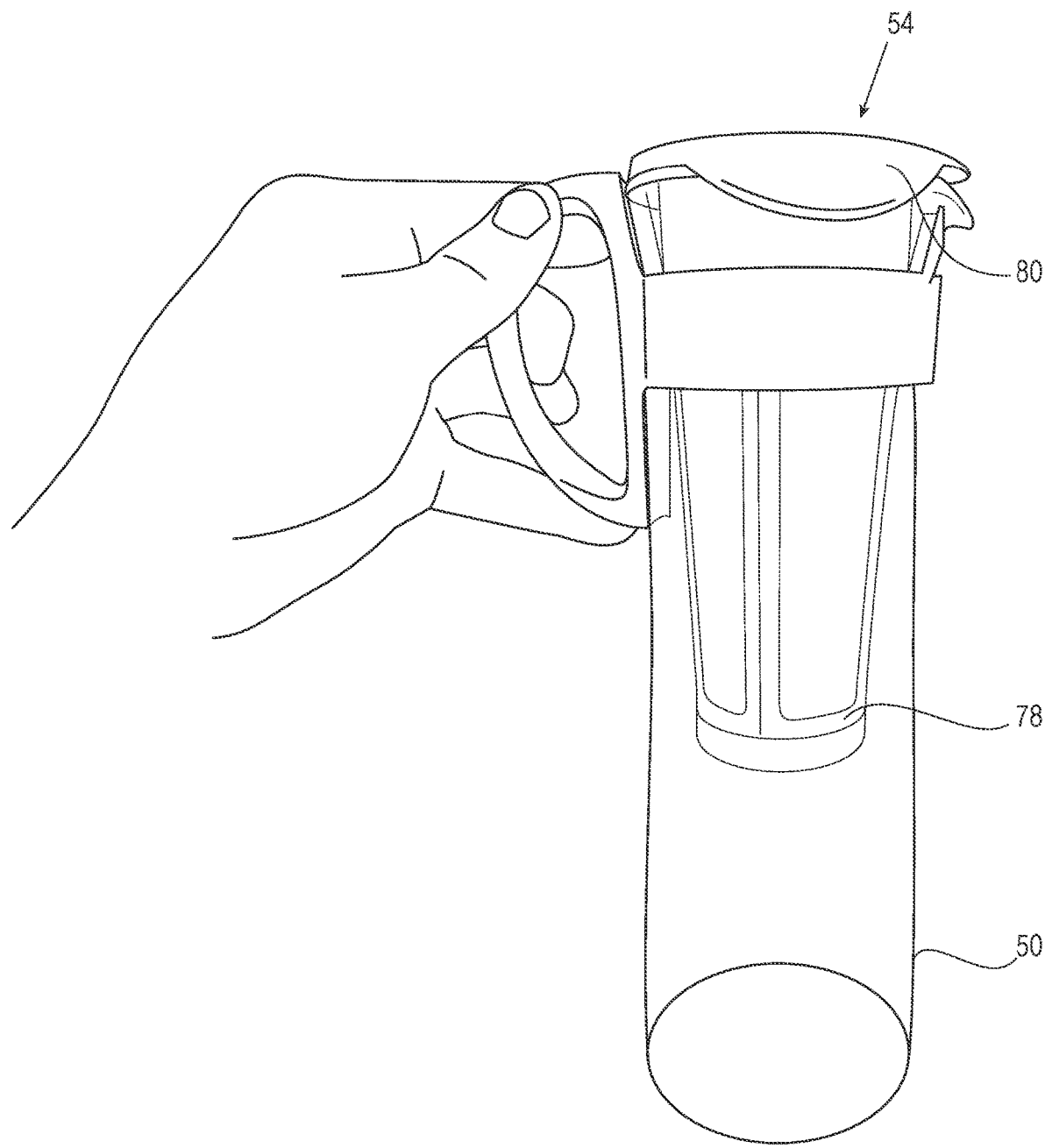
FIG. 12 is an elevation view of the agitator of FIG. 7 fully inserted by the user into the interior volume of the filter container which is, in turn, disposed within an interior volume of the brewing vessel of the cold brewing system.

In use, some method embodiments for enhancing infusion of a liquid may include inserting a radiator 56 of an agitator 54 into an infusion mixture 26 as shown in FIGS. 11 and 12 and selecting vibration energy emission characteristics and inputting these characteristics into a controller 14 of the agitator 54. The method may further include emitting vibration energy having the selected vibration energy emission characteristics from a vibration source 12 of the agitator 54 into the infusion mixture in order to control and enhance an infusion process.

For the agitator embodiments 54 that include a flange secured to the radiator 56 adjacent the proximal end of the radiator body 58 as discussed above, inserting the radiator 56 into the infusion mixture 26 may further include inserting the radiator 56 into the infusion mixture 26 until the flange 66 contacts and rests upon an upper edge 114 of a container 78 that contains the infusion mixture 26. Such an arrangement can help stabilize the vertical position of the agitator 54 relative to the container 78 that holds the infusion mixture 26. The flange 66, in some cases, may also serve to cover the infusion mixture 26 during the infusion process. For flange embodiments 66 that include a lip 80 secured to and extending distally from the flange 66, inserting the radiator 56 into the infusion mixture 26 may further include inserting the radiator 56 into the infusion mixture 26 until the lip 80 overlaps and is disposed about the upper edge 114 of the container 78 that contains the infusion mixture 26. Such a lip structure 80 may serve to further stabilize the position of the agitator 54 and radiator 56 thereof after insertion of the radiator 56 into the infusion mixture 26 and during the infusion process.

For agitator embodiments that include a removably insertable enclosure 96 that houses the vibration source 12, power source 16, and/or controller 14, the method of using the agitator 54 may further include inserting the enclosure 96 into the lumen 102 of the radiator 56 such that the vibration source 12 is in operative communication with the radiator 56 as discussed above. In addition, the enclosure 96 may be withdrawn from the lumen 102 of the radiator body 58 in order to clean the device or service the components within the enclosure 96.

Once the radiator 56 of the agitator 54 has been operatively inserted into the infusion mixture 26, power may be supplied to the vibration source 12 from the power source 16 while a control signal 110 (which may be a wireless signal or an electrical signal transmitted through wires) is transmitted to the vibration source 12 such that vibration energy having characteristics chosen by the user may then be emitted into the infusion mixture 26 to achieve a desired level of infusion enhancement and control. The user may select the desired vibration energy parameters by entering the parameters into the controller 14 by means of a user interface 116 that may include one or more buttons 106 which may be depressed or otherwise actuated by the user in order to program or otherwise instruct the controller 14 to produce the appropriate control signal 110 and transmit that control signal 110 to the vibration source 12 during the infusion process.

For convenient control and use, as discussed above, the controller 14 of some agitator embodiments 54 may be configured to be in wireless communication with a remote controller 108. For example, in some cases, such a remote controller 108 may include a smart phone application that a user may install on their existing equipment if so desired. In other cases, the remote controller may include a separate wireless controller. For such embodiments, the entry of vibration energy parameters by a user may include entering vibration energy parameters into the remote controller 108 by depressing buttons 106 or the like of the remote controller 108. The remote controller 108 will then transmit a control signal 110 to the controller 14 which is adjacent the vibration source (which, in this case, may be referred to as a primary controller). The primary controller 14 then transmits the corresponding control signal, which may be an electrical signal over a wired connection 22 in some cases, to the vibration source. For such embodiments that include remote controllers 108, and particularly remote controllers 108 in the form of a smart phone application, it may be useful for the remote controller 108 to be programmable to store a particular set of vibration energy parameters and timing schedule as a "recipe" for infusion enhancement and control. In this way, the user may simply select a stored infusion recipe as a shortcut for repeating previously used regimens that the user wants to repeat.

As discussed above, during the infusion process, the controller 14 may control any one or more of vibration duration, vibration displacement, vibration frequency, and vibration schedule. In some cases, selecting vibration energy emission characteristics and inputting these characteristics into the controller of the agitator 54 include selecting a vibration power level from pre-selected levels of vibration power, including low power, medium power and high power. In some cases, selecting vibration energy emission characteristics and inputting these characteristics into the controller 14 of the agitator 54 may include selecting a duration of vibration energy emission for a time of about 1 minute to about 60 minutes. In some cases, selecting vibration energy emission characteristics and inputting these characteristics into a controller of the agitator may include selecting a duration of vibration energy emission from a pre-selected menu of vibration energy emission durations including 1 minute, 5 minutes and 10 minutes. Once such parameters have been selected and inputted into the controller 14, the controller 14 may then generate a corresponding control signal 110 which is transmitted to the vibration source which in turn emits vibration energy having the selected parameters for the selected duration or durations.

In some cases, as discussed above, the controller 14 may be programmed by a user to generate a control signal 110 to the vibration source 12 resulting an emission of vibration energy having a vibration acceleration of about 0.01 m/s2 to about 200 m/s2, a vibration speed of about 0.01 mm/s to about 200 mm/s, and a vibration displacement of about 0.001 mm to about 2 mm. Furthermore, in some cases, the vibration source 12 may be programmed to produce vibration energy having a vibration acceleration of about 4 m/s2 to about 60 m/s2, a vibration speed of about 7 mm/s to about 55 mm/s, and a vibration displacement of about 0.08 mm to about 0.7 mm. Vibration energy parameters such as shown in the chart of FIG. 19 may be emitted by the vibration source 12 as a result of the transmission or a corresponding control signal 110 from the controller 14. The controller 14 may be further programmed to produce a control signal 110 transmitted to the vibration source 12 which produces any combination of the vibration energy parameters shown in the chart of FIG. 19 or any other suitable vibration energy parameters.

Figure 15:
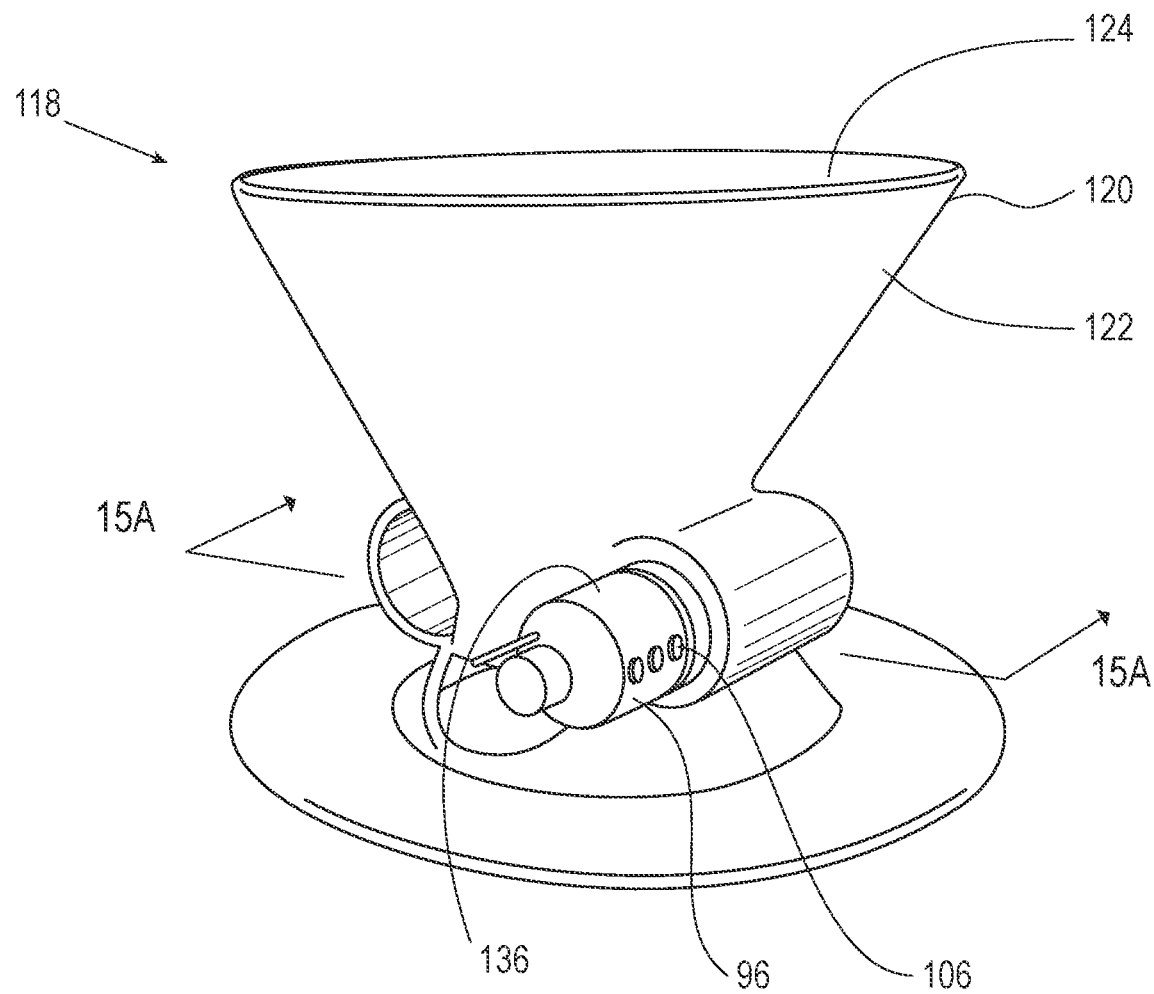
FIG. 15 is an elevation view of an agitator embodiment that is releasably secured to a pour over type filter container with a receptacle type attachment.
Figure 15A:
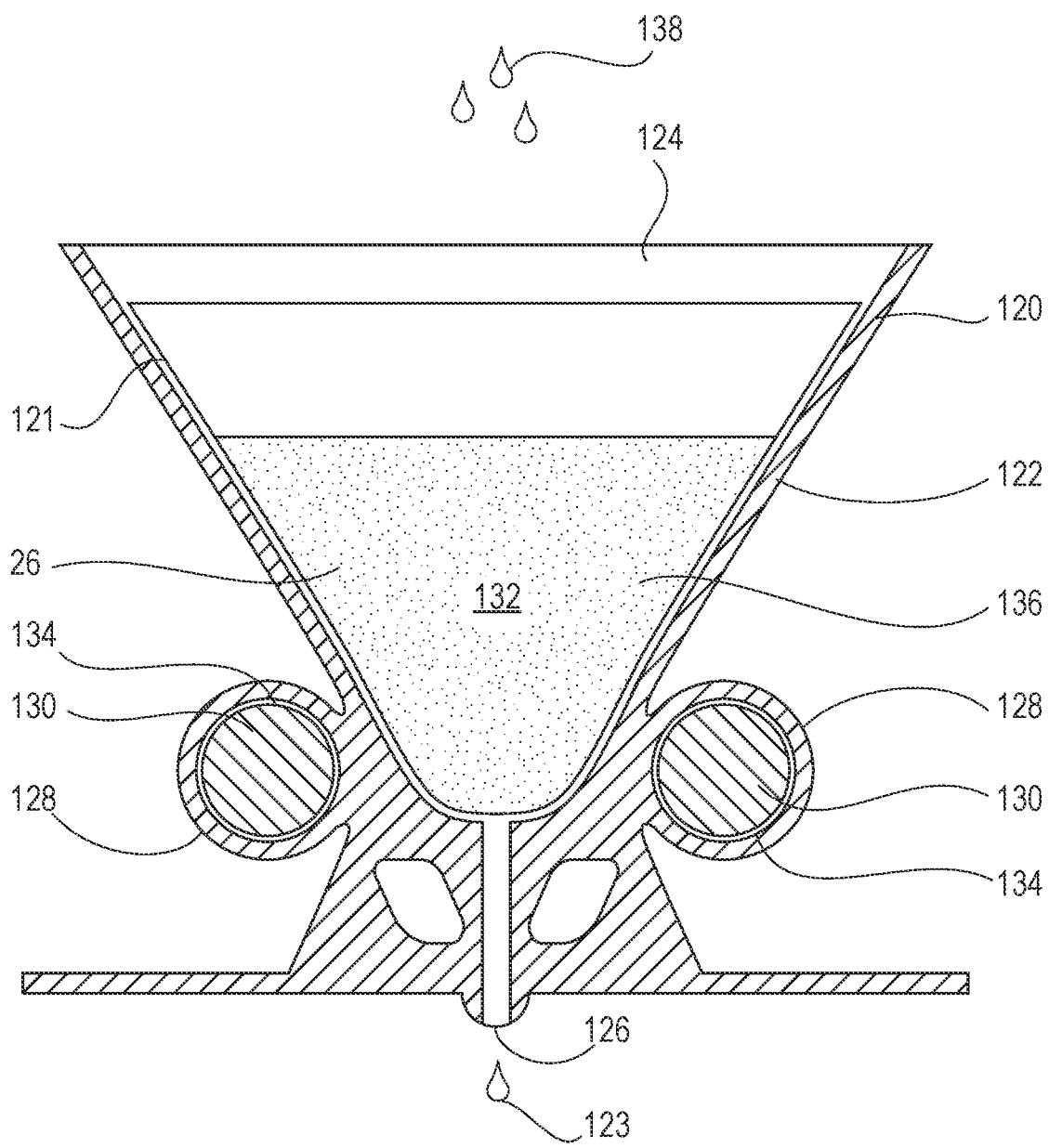
FIG. 15A is a section view of the pour over type filter container with clip attachment of FIG. 15 taken along lines 15A-15A and shown without the agitator for clarity of illustration.

As discussed above, some agitator embodiments for enhancing infusion of a liquid may be configured to be integral with a brewing system or component thereof. Referring to FIGS. 15-15A, an agitator 118 includes a pour over type filter container 120 that may typically be used to hold a filter 121 in an open funnel shaped position and which may then be filled with a desired solid material (such as ground coffee or the like). A liquid such as water may then be poured over the solid material to infuse the water with the desired components of the solid material to generate in infused liquid 123 (such as coffee or the like). In some cases, a corresponding agitator embodiment may include a filter container 120 having a wall 122 with a funnel shaped contour, an upper opening 124, at least one lower opening 126 that is smaller than the upper opening 124 and at least one receptacle 128 as shown in FIGS. 15-15A. Such an agitator embodiment 118 may further include a modular agitator assembly 130 (which in some cases may be the same as or similar to the enclosure 96 and its associated components 12, 14, 16 discussed above), having a vibration source 12, a power source 16 operatively coupled to the vibration source 12, and a controller 14 in operative communication with the vibration source 12. In addition, the modular agitator assembly 130 may have an enclosure 96 herein the vibration source 12, power source 16 and controller 14 are disposed within the enclosure 96. Such an enclosure 96 may have an outer surface which is sized and configured to be removably inserted into the receptacle 128 (or optional dual receptacles 128 as shown in FIG. 15) with the vibration source 12 in operative communication with an interior volume 132 of the filter container 120. Such an arrangement may allow the vibration source 12 of the modular agitator assembly 130 to emit vibration energy having parameters tuned by a user into an infusion mixture 26.

For certain embodiments, the enclosure 96 may have a cylindrically shaped body and the receptacle 128, or plurality of receptacles 128, may have a cylindrically shaped orifice 134 sized to receive the outer surface 98 of the enclosure 96 with an interference type fit or any other suitable arrangement by which to releasably secure the modular agitator assembly 130 into the receptacle or receptacles 128. For such a pour over type agitator embodiment 118, a user would insert the modular agitator assembly or assemblies 130 into the cylindrically shaped orifice 134 such that each respective vibration source 12 is in operative communication with the wall 122 of the pour over type filter container 120 and any contents of the interior volume 132 of the filter container 120 such as an infusion mixture 26 disposed therein. A filter 121 may optionally be placed into the filter container 120 and then a desired solid material 136 may be placed into the interior of the filter 121. The vibration source 12 of the modular agitator assembly 130 may then be activated by a control signal 110 from the controller 14 with power to the vibration source being supplied by the power supply 16 (see FIG. 8). The vibration source 12 may then emit vibration energy into the interior volume 132 of the filter container 120 as a liquid 138 is being poured over the solid material 136 in the filter 121 during the infusion process. The controller 14 may be programmed to provide a control signal 110 corresponding to any of the vibration energy parameters of any of the agitator embodiments discussed above in order to carry out the desired enhancement and control of the infusion process.

Figure 27:
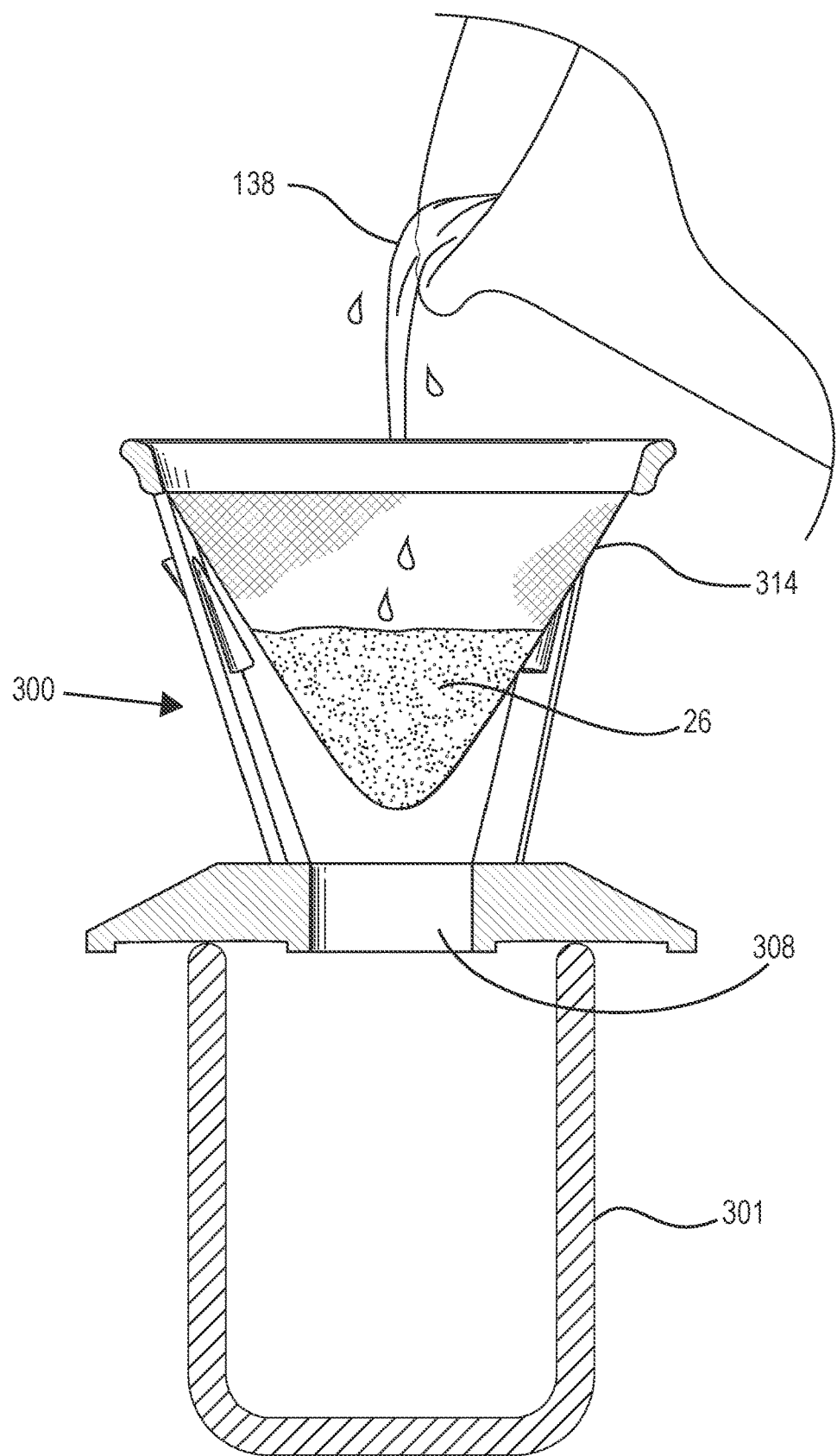
FIG. 27 is a schematic elevation view of the agitator embodiment of FIG. 26 disposed and operatively coupled to the cup with the filter basket operatively coupled to the agitator and water being poured over the solid infusion material to form an infusion mixture therein.

In some cases, it may be desirable to apply vibration energy to an infusion mixture embodiment 26 while using a pour over filter container that is disposed directly over a cup, mug or any other suitable vessel 301. FIGS. 21-25 show an agitator embodiment 300 that may be used to apply vibration energy to an infusion mixture 26 (as shown in FIG. 27) during pour over type brewing, or any other suitable brewing method. The agitator embodiment 300 shown may include a housing base 302 having a rigid annular configuration with an upper surface 304 and a lower surface 306 which is disposed opposite the housing base annulus structure of the upper surface 304. The housing base 302 may further include an interior cavity 303 disposed between the upper surface 304 and the lower surface 306. For some embodiments, the housing base 302 includes a sealed interior volume 303 and the power source 16 and controller 14 may be disposed within the sealed interior volume 303 of the housing base 302.

A vibration isolation pad 320 may be disposed on and secured to the lower surface 306 of the housing base 302. The vibration isolation pad 320 may include a soft elastic material with a high coefficient of friction in order to serve as a vibration buffer between the housing base 302 and the cup 301 in order to isolate the cup 301 from the vibration energy and help maintain the position of the agitator 300 relative to the cup 301 during use. In some cases, the vibration isolation pad 320 may include a flat annular ring of such material disposed about and secured to the lower surface 306 of the annular ring configuration of the housing base 302. The annular ring configuration of some vibration isolation pad embodiments 320 may include an aperture such as a central aperture 219 as shown in FIG. 22A.

Figure 22:
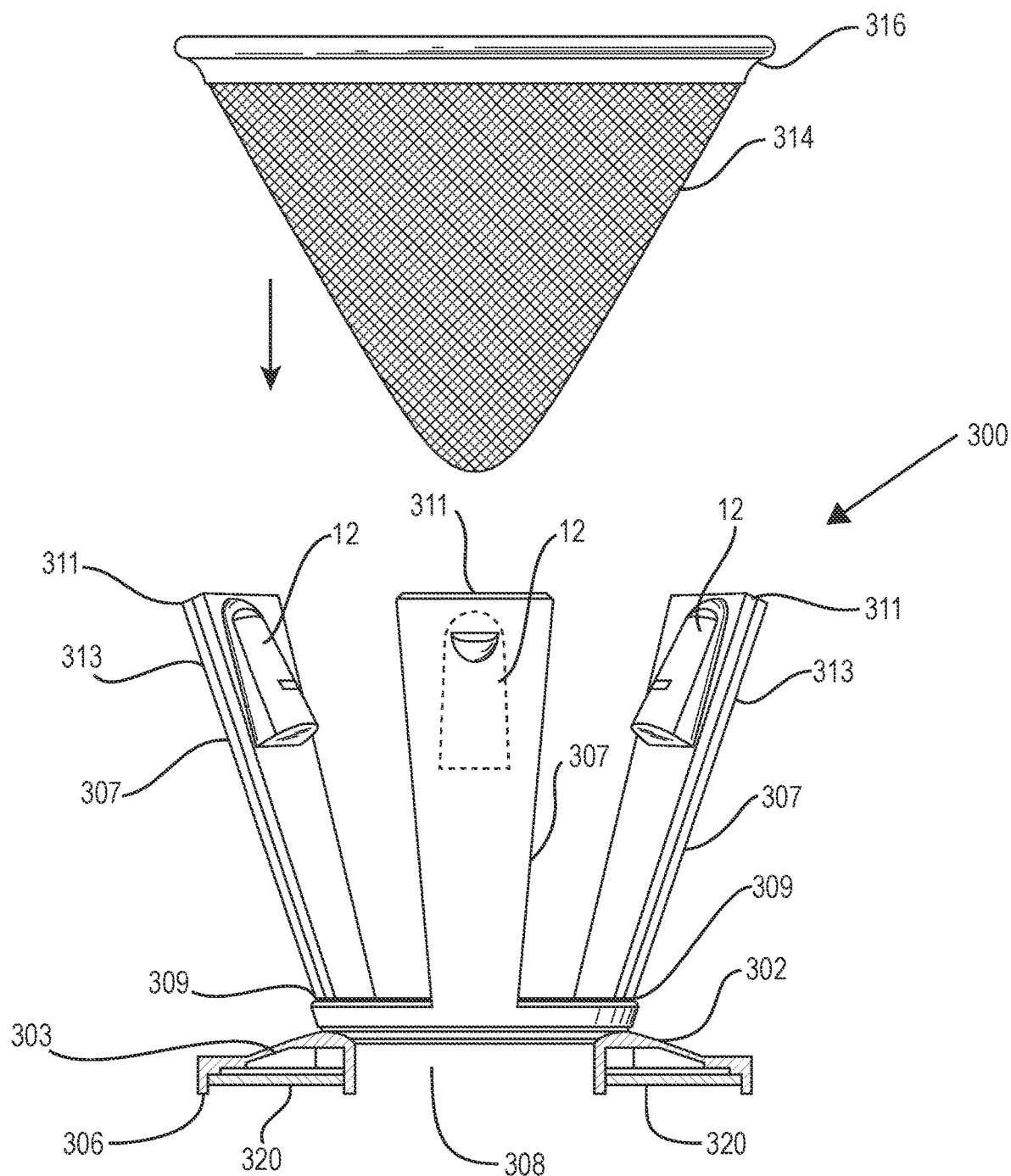
FIG. 22 is an exploded elevation view of the agitator embodiment of FIG. 21 with a filter basket thereof disposed above the housing of the agitator.
Figure 22A:
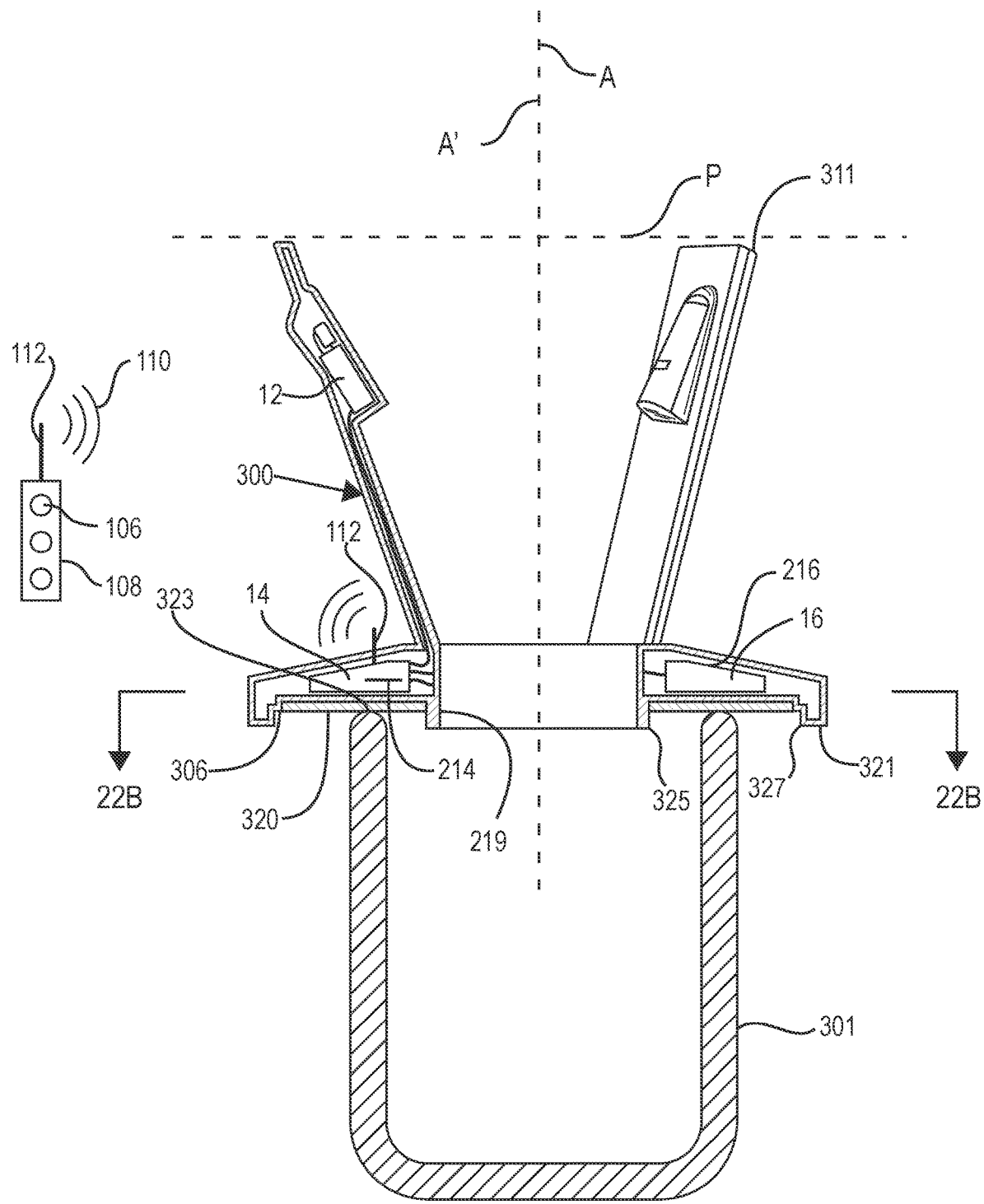
FIG. 22A is an elevation view in section of the agitator embodiment of FIG. 21 disposed on a cup.

In some cases, the lower surface 306 of the housing base 302 may include a cup retainer 321, as shown in FIG. 22A, that is configured to engage an upper edge 323 of the cup 301 and prevent the agitator 300 (or lower surface 306 thereof) from sliding off of the upper edge 323 of the cup 301 during operation of the agitator 300 in conjunction with the optional vibration isolation pad 320. In some cases, the cup retainer 321 may include a plurality of cup retaining structures such as an inner ridge 325 that extends downwardly from the lower surface 306 of the base housing 302 and an outer ridge 327 that also extends downwardly from the lower surface of the base housing 302. In some cases, the downward extension of the inner ridge 325 and/or outer ridge 327 from a nominal lower surface 306 of the housing base 302 may be about 0.05 inches to about 0.4 inches.

An aperture may be disposed through the housing base and may include a central aperture 308 extending from the upper surface 304 to the lower surface 306 of the housing base. The central aperture 308 may have a longitudinal axis A, as shown in FIG. 22A, that is colinear with an axis A' of the housing base 302 generally. The central aperture 308 or aperture generally, may be sized and positioned to allow the passage of infused fluids being emitted from a filter basket 314 which is operatively coupled to the agitator embodiment 300 into the cup 301 disposed beneath and operatively coupled to the agitator 300. In some cases, the aperture 308 may have a transverse dimension of about 0.8 inches to about 3.0 inches or more.

A plurality of support extensions 307 which may have a resilient rigid or semi-rigid configuration may each have a respective lower end 309 which is secured to the housing base 302. The respective lower ends 309 may be disposed generally about a circular ring like profile that encompasses the central aperture 308. Each of the support extensions 307 may have an upper end 311 that extends in an upward direction from the upper surface 304 of the housing 302. In some cases, the upper ends 311 may extend in an upward and radially outward direction to a point of common separation or distance from upper surface 304 of the housing base 302. In some cases, upper surfaces of the upper ends 311 of the support extensions 307 may lie in substantially the same plane P as shown in FIG. 22A. For the agitator embodiment 300 shown, three support extensions 307 are included and are substantially equally spaced from each other in a circumferential orientation about the circular ring like profile that encompasses the aperture 308 of the housing base 302, however, any suitable or desired circumferential spacing of the plurality of support extensions 307 may be used. In addition, although the agitator embodiment 300 shown includes three support extensions 307 that have upper ends 311 that extend in an upward and radially outward direction from the upper surface 304 of the housing base 302, any suitable number of the plurality of support extensions 307 may be used, including, 2, 3, 4, 5, 6 or more support extensions 307.

The agitator 300 may further include one or more vibration sources 12, including a plurality of vibration sources 12 with each vibration source 12 being disposed on and operatively coupled to an upper section 313 of a separate and different respective support extension 307. For some embodiments, the upper section 313 of each support extension 307 may include the upper half of that support extension 307 for purposes of the agitator embodiments 300 discussed herein. Although the agitator embodiment 300 shown includes three separate vibration sources 12, with each vibration source 12 be secured and operatively coupled to an upper section 313 of a separate support extension 307, any other suitable configuration may be used. For example, the agitator embodiment 300 may have three separate support extensions 307, but only one vibration source 12 coupled to a single one of the support extensions 307 with the remaining two support extensions 307 serving only to provide vertical support and stability to a filter basket 314 coupled thereto. In addition, for some embodiments, multiple vibration sources 12 may be operatively coupled to a single support extension 307 and the vibration source or sources 12 may also be disposed on portions of the respective support extensions 307 other than the upper sections 313, such as a middle or lower section of the support extension 307.

Figure 22B:
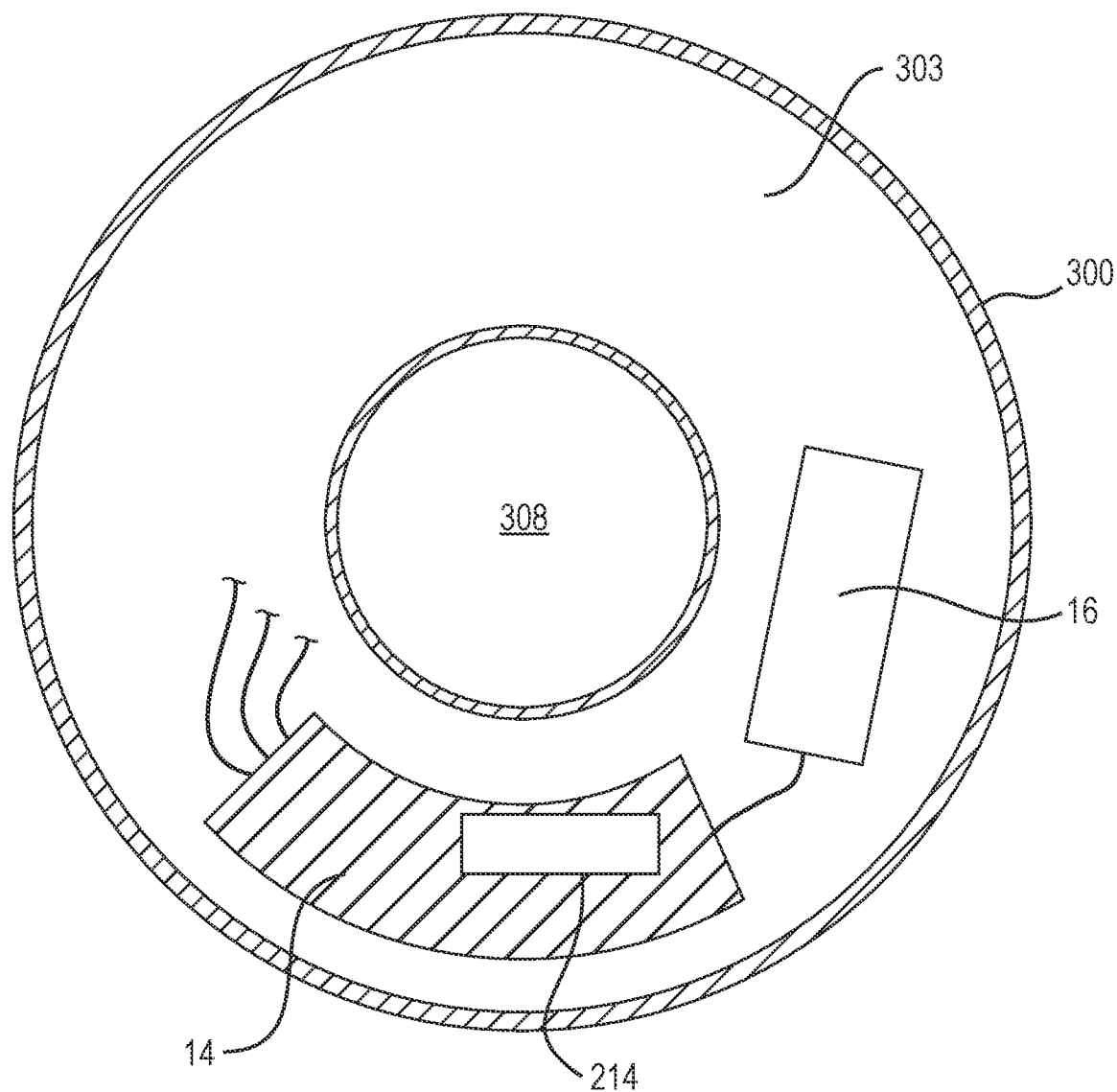
FIG. 22B is a section view of the agitator embodiment of FIG. 22A taken along lines 22B-22B of FIG. 22A.

The controller 14 may be disposed in operative communication with each of the plurality of vibration sources 12 and the power source 16 with conductive conduits 217 which may be configured to transmit energy, information or the like. Such conductive conduits 217 may include conductive electrical wires, such as copper wires, fiber optics, wireless channels or the like. The power source 16 may include a power storage device such as a battery, including a rechargeable battery 216, may also be operatively coupled to the controller 14 as shown in FIGS. 22A and 22B. In some instances, the controller 14 which may be disposed in operative communication with each of the plurality of vibration sources 12 may be disposed within the interior cavity 303 of the housing base 302 and may also be configured for wireless communication with an external remote control device 108 as shown in FIG. 13 and discussed above.

Figure 23:
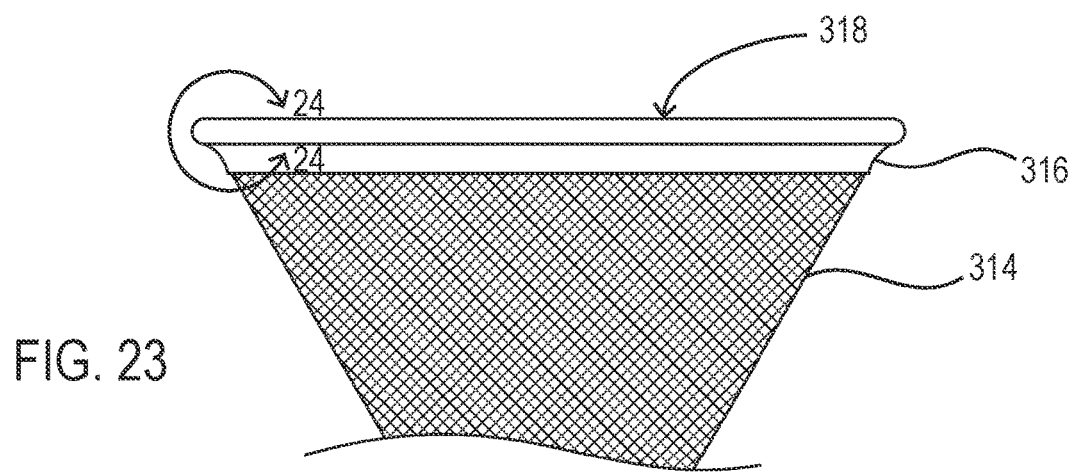
FIG. 23 is an elevation view of an upper ring of a filter basket embodiment of the agitator embodiment of FIG. 21.
Figure 24:
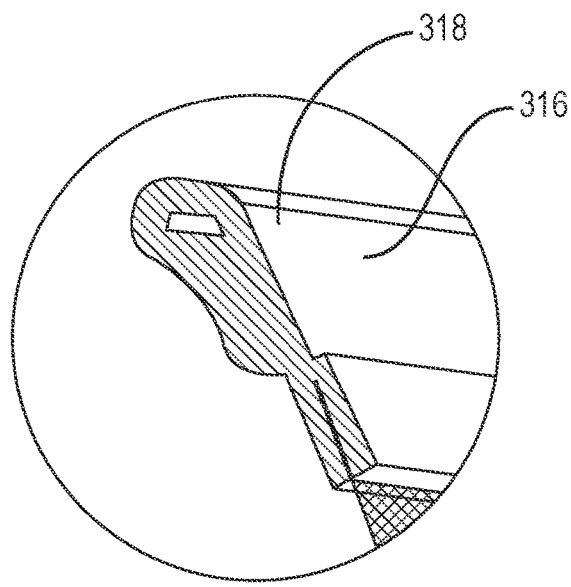
FIG. 24 is an enlarged view in section of the upper ring of the filter basket of the agitator embodiment of FIG. 23 taken along lines 24-24 of FIG. 23.

In some cases, the agitator 300 or an assembly thereof may further include the optional filter basket 314 that has an interior volume 315 at least partially bounded by a filter material 154 and an upper ring 316, as shown in FIGS. 23 and 24, defining an upper aperture 318. In some instances, the upper ring 316 may be configured to engage an upper end 311 of each of the plurality of support extensions 307 so as to provide upward support and coupling of vibration energy to the filter basket 314 from the support extensions 307 when the upper ring 316 of the filter basket 314 is engaged with the upper surfaces of the upper ends 311 of the support extensions 307. In some cases, the filter basket 314 may have a generally conical configuration disposed below the upper ring 316 which includes filter material 154 that may further include any suitable resilient mesh material having a large number of suitably sized perforations or holes per square inch. Although generally conical in shape, the filter basket 314 may have any other suitable shape that will direct infused liquid along a desired path. In some cases, mesh embodiments of the filter material 154 of the filter basket 314 may have perforations therethrough with a transverse dimension of about 0.002 inches to about 0.010 inches. For such embodiments of the filter material, a large number of perforations per square inch may include about 5,000 to about 200,000 perforations per inch.

For the agitator embodiment 300, elements such as the vibration source 12, controller 14 and power source 16 may have features, dimensions and materials which are the same as or similar to those of the vibration source 12, controller 14 and power source 16 of other agitator embodiments discussed above. The same holds true for any other elements of agitator embodiment 300 that have the same reference numbers as those discussed above.

For example, for convenient control and use, the controller 14 of some agitator embodiments 300 may be configured to be in wireless communication with an external remote controller 108 as shown on the embodiments of FIGS. 6 and 13 discussed above and in the agitator embodiment 300 shown in FIG. 22A. For example, in some cases, such a remote controller 108 may include a smart phone application that a user may install on their existing equipment if so desired. In other cases, the remote controller 108 may include a separate wireless controller. Such a remote controller 108 may emit a control signal 110 that includes vibration energy emission information to the controller 14, which in some cases may be referred to as the "primary" controller 14. For such embodiments, both the primary controller 14 and remote controller 108 may include a signal emitter, such as an antenna 112, in order to communicate their respective signals to each other.

For some embodiments, in order to provide a desired level of infusion enhancement and control, it may be useful for some vibration source embodiments 12 to emit vibration energy having particular characteristics. For some embodiments, the vibration source 12 may be configured to produce vibration energy having a vibration acceleration of about 0.01 m/s2 to about 200 m/s2, a vibration speed of about 0.01 mm/s to about 200 mm/s, and a vibration displacement of about 0.001 mm to about 2 mm. Furthermore, in some cases, the vibration source 12 may be configured to produce vibration energy having a vibration acceleration of about 4 m/s2 to about 60 m/s2, a vibration speed of about 7 mm/s to about 55 mm/s, and a vibration displacement of about 0.08 mm to about 0.7 mm. For such embodiments, the controller 14 may be configured to provide a control signal, such as, for example, control signal 110 discussed above, to the vibration source 12 to emit vibration energy having any of these vibration energy parameters. Vibration energy parameters such as these are also shown in the chart of FIG. 19 and controller embodiments 14 may be configured to produce any combination of the vibration energy parameters shown in the chart of FIG. 19 or any other suitable vibration energy parameters.

Figure 25:
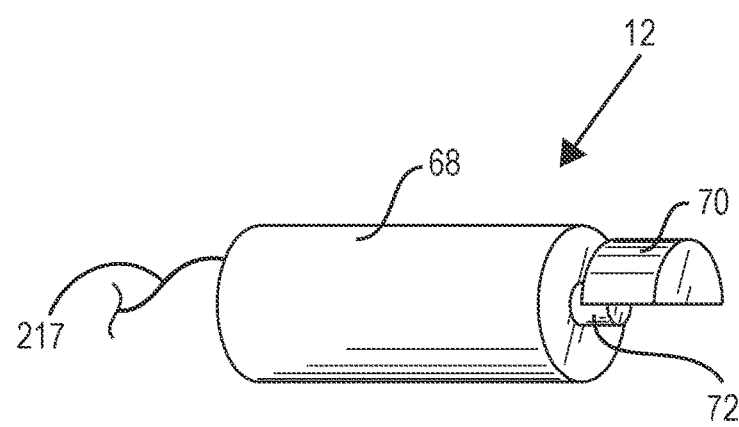
FIG. 25 is a perspective view of a vibration source embodiment of the agitator embodiment of FIG. 21.

For the agitator embodiments 300 shown in FIGS. 21-25, the vibration source 12 may include the electric motor 68 coupled to an offset weight 70 by a shaft 72 as shown in the agitator embodiment of FIG. 8 and also shown in FIG. 25. For some embodiments, the electric motor 68 and offset weight 70 may be configured to generate vibration energy at frequencies of about 1 Hz to about 10,000 Hz in some cases, and about 1 Hz to about 1000 Hz in some cases. The electric motor 68 of the vibration source 12 may be operatively coupled to the controller 14 by a plurality of conduits which are configured to conduct electrical energy. Such conduits may include an electrical wire harness 212. The controller 14 may also operatively coupled to the power source 16 with a conduit 217. In some cases, the power source 16 may include a rechargeable battery 216 as shown. The rechargeable battery 216 may be recharged with a recharging cable (not shown) which may be coupled to a recharging port which may disposed on and operatively coupled to the controller 14. The rechargeable battery 216 may also be charged by any other suitable method such as inductive charging or the like.

The controller 14 may be configured to accept programming instructions, save programmed values and generate control signals to be communicated to the vibration source 12 and components thereof. In some cases, it may also be useful to include electronic components of the controller 14 which are heat tolerant to temperatures up to the temperature of boiling water, that is about 100 degrees Celsius, for at least 5 minutes in some cases. In some cases, such electronic components that include semiconductor components may be made from silicon for use in these embodiments.

Figure 21:
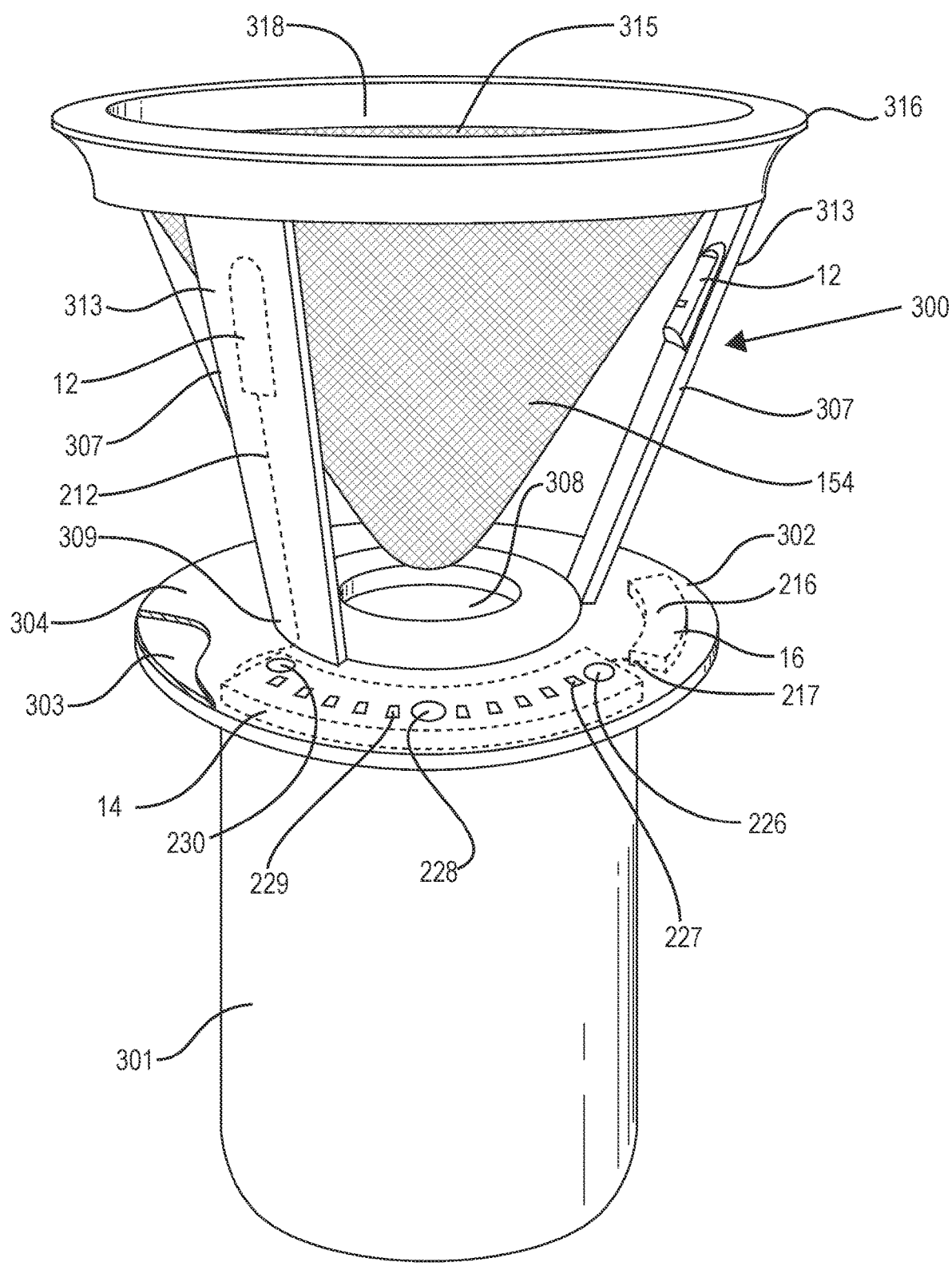
FIG. 21 is a perspective view of an agitator embodiment coupled to a mug.

For some agitator embodiments 300, the controller 14 or any other suitable portion of the agitator 300 may include a user interface that includes a first switch that may be used to toggle through a plurality of predetermined vibration power levels. For example, in some cases, such a first switch may include a first button 226, as shown in FIG. 21, that is responsive to finger pressure, may be waterproof and may be depressed in order to toggle between a first power level, a second power level, a third power level, a fourth power level and a fifth power level, with each of these power levels being different from the others.

In some cases, the first power level may represent the lowest power level and the fifth power level represents the highest power level, with the second power level through fourth power levels representing corresponding intermediate power level values. Although some embodiments include the five power levels discussed above, any suitable number of discrete power levels may be used including 6, 7, 8, 9 10 or more power levels which may be selected by a single power level switch or multiple power level switches. It should be noted that varying the vibration energy output by the vibration source 12 at the various power levels may be carried out by configuring the controller 14 to generate varying rotation speed of a motor 68 having an offset weight 70 disposed on the output shaft 72 thereof for such a vibration source embodiment 12.

Regarding the power level set by a user by depressing the first button 226, visual feedback from the agitator to the user may be used to confirm the power level setting selected by the user. For example, a separate indicator light corresponding to each of the five predetermined power levels 1-5 may be emitted from an outside surface of the housing base 302 when a corresponding power level is selected. For the agitator embodiments 300 illustrated, a linear array of five indicator lights 227 may be disposed adjacent the first button 226. Such an array of indicator lights 227 may be configured to emit light through a waterproof membrane (not shown) of the housing base 302 in some cases. In some cases, the controller 14 may be configured to illuminate each indicator light 227 of the linear array corresponding a predetermined power level in any fashion that may provide a user friendly interface to indicate the selected power level to a user. For some embodiments, a first indicator light 227 disposed at either end of the linear array may be activated when the first power level is selected. When the second power level is selected, a second indicator light disposed adjacent the first indicator light may then be activated and so on. In some cases, the first indicator light 227 may be deactivated upon activation of the second indicator light 227, or it may also remain on to provide the user with visual "light column" to indicate the power level selected.

For some such agitator embodiments 300, the controller 14 or any other suitable portion of the agitator 300 may include the user interface with a second switch that may be used to toggle through a plurality of predetermined vibration duration periods. For example, in some cases, such a second switch may include a second button 228 that is responsive to finger pressure, may be waterproof, and may be depressed in order to toggle between a first predetermined vibration period, a second predetermined vibration period, a third predetermined vibration period, a fourth predetermined vibration period and a fifth predetermined vibration period, with each of these vibration periods being different from the others.

In some cases, the first vibration period may represent the shortest vibration period and the fifth vibration period may represent the longest vibration period, with the second vibration period through fourth vibration period representing corresponding intermediate vibration period values. Although some embodiments may include the five vibration periods discussed above, any suitable number of discrete vibration periods may be used including 6, 7, 8, 9 10 or more vibration periods which may be selected by a single vibration period switch 106 or multiple vibration period selection switches.

It should be noted that a range of the vibration period durations may be set differently for different processes. For some embodiments that are being used for hot brewing, the first vibration period may be set to about 1 minute, the second vibration period about 2 minutes, the third vibration period about 3 minutes, the fourth vibration period about 4 minutes and the fifth vibration period may optionally include a programmable vibration period pattern and/or vibration period that may be controlled remotely such as by a smart phone application or separate remote control device.

Regarding the vibration period set by a user by depressing the second button 228, visual feedback from the agitator to the user may be used to confirm the vibration period setting selected by the user. For example, a separate indicator light corresponding to each of the five predetermined vibration durations 1-5 may be emitted from an outside surface of the housing 302 when a corresponding vibration duration setting is selected. For the agitator embodiments 300 illustrated, a linear array of five indicator lights 229 is disposed adjacent the second button 228. Such an array of indicator lights 229 may be configured to emit light through a waterproof membrane (not shown) of the housing 302 in some cases. In some cases, the controller 14 may be configured to illuminate each indicator light 229 of the linear array corresponding a predetermined vibration duration in any fashion that may provide a user friendly interface to indicate the selected vibration duration to a user. For some embodiments, a first indicator light 229 disposed at either end of the linear array corresponding to vibration duration settings may be activated when the first vibration duration is selected. When the second vibration duration is selected, a second indicator light disposed adjacent the first indicator light may then be activated and so on. In some cases, the first indicator light 229 may be deactivated upon activation of the second indicator light 229, or it may also remain on to provide the user with visual "light column" to indicate the vibration duration selected.

In some cases, the controller 14 of agitator embodiments 300 may also include a speaker 230 which is operatively coupled thereto and which may be disposed on a PCB 214. Such a speaker 230 may be disposed at any suitable position on the agitator embodiments 300 and may include a waterproof speaker 230 in some cases. The speaker 230 may also be configured to emit a tone or other audio signal that may alert a user of the agitator 300 to a variety of processes being carried out by the agitator 300. For example, the controller 14 may be configured to emit a tone from the speaker 230 to indicate the passage of time, to indicate completion of a brew cycle including completion of a preselected vibration period, to indicate when vibration energy output has been enabled or disabled and the like.

In use, the agitator embodiments 300 may be programmed by a user so as to set a vibration energy power level by sequentially depressing the first button 226 until as desired power level is attained and optionally indicated by the linear array of indicator lights 227. The user may also similarly set the desired vibration duration level by sequentially depressing the second button 228 until a desired vibration duration level is attained and optionally indicated by the linear array of indicator lights 229. The agitator may then be activated to emit vibration energy from an outside surface thereof corresponding to the selected vibration energy power level and vibration energy duration parameters. The emitted vibration energy may then be operatively coupled to an infusion mixture 26 disposed within the interior volume 315 of the filter basket 314 during brewing. In some cases, the agitator 300 may be so used to selectively infuse the infusion mixture 26 and end product therefrom with a desired level of dissolved components and undissolved solids to achieve a desired flavor. In some cases, the application of vibration energy to an infusion mixture 26 disposed within the interior volume 315 during a brewing process may be useful to enhance and improve extraction of soluble coffee material from the coffee grounds by evenly and consistently mixing the coffee grounds and water of the infusion mixture 26, for example.

Figure 26:
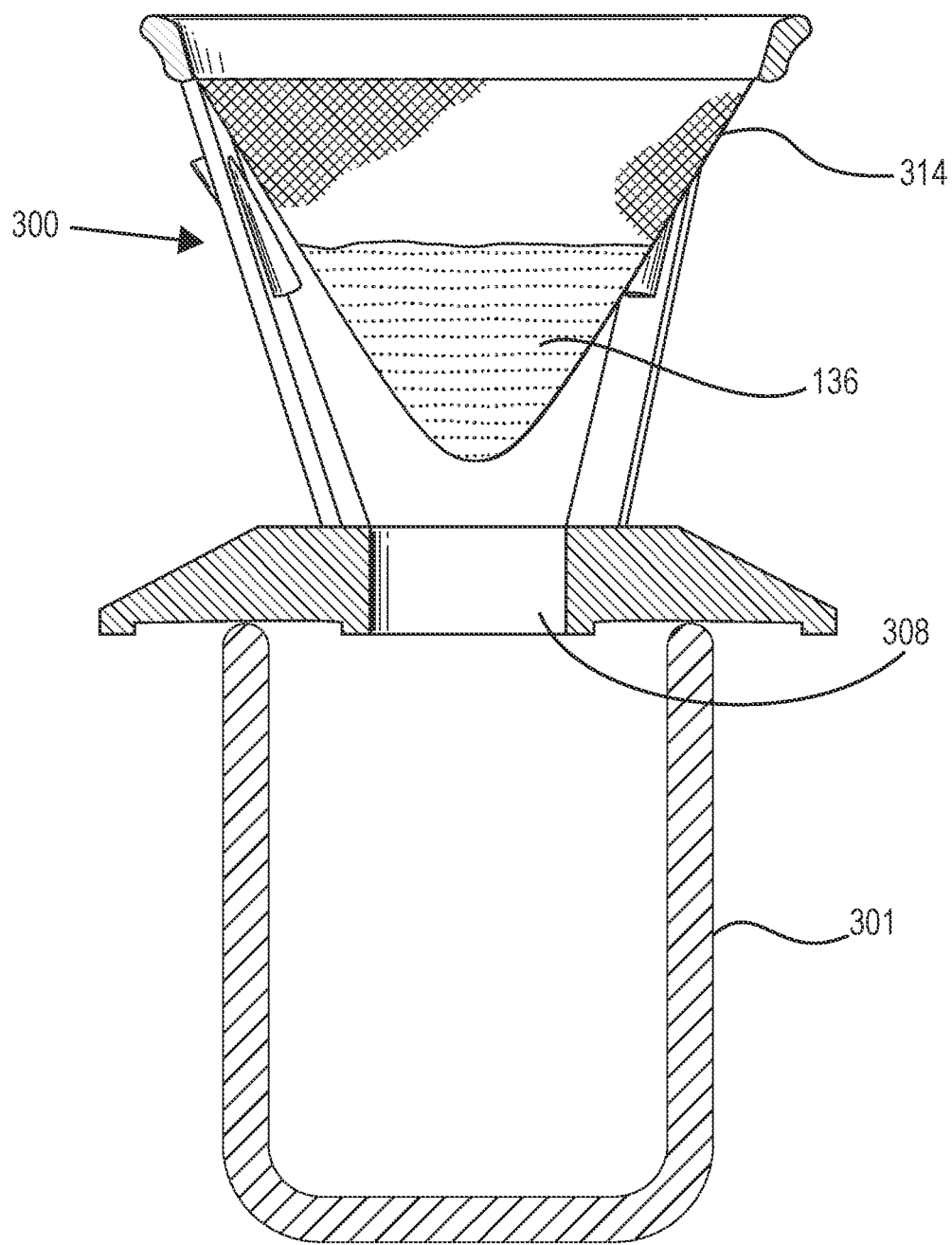
FIG. 26 is a schematic elevation view of the agitator embodiment of FIG. 21 disposed and operatively coupled to a cup with a filter basket operatively coupled to the agitator and solid infusion material disposed in the filter basket.
Figure 28:
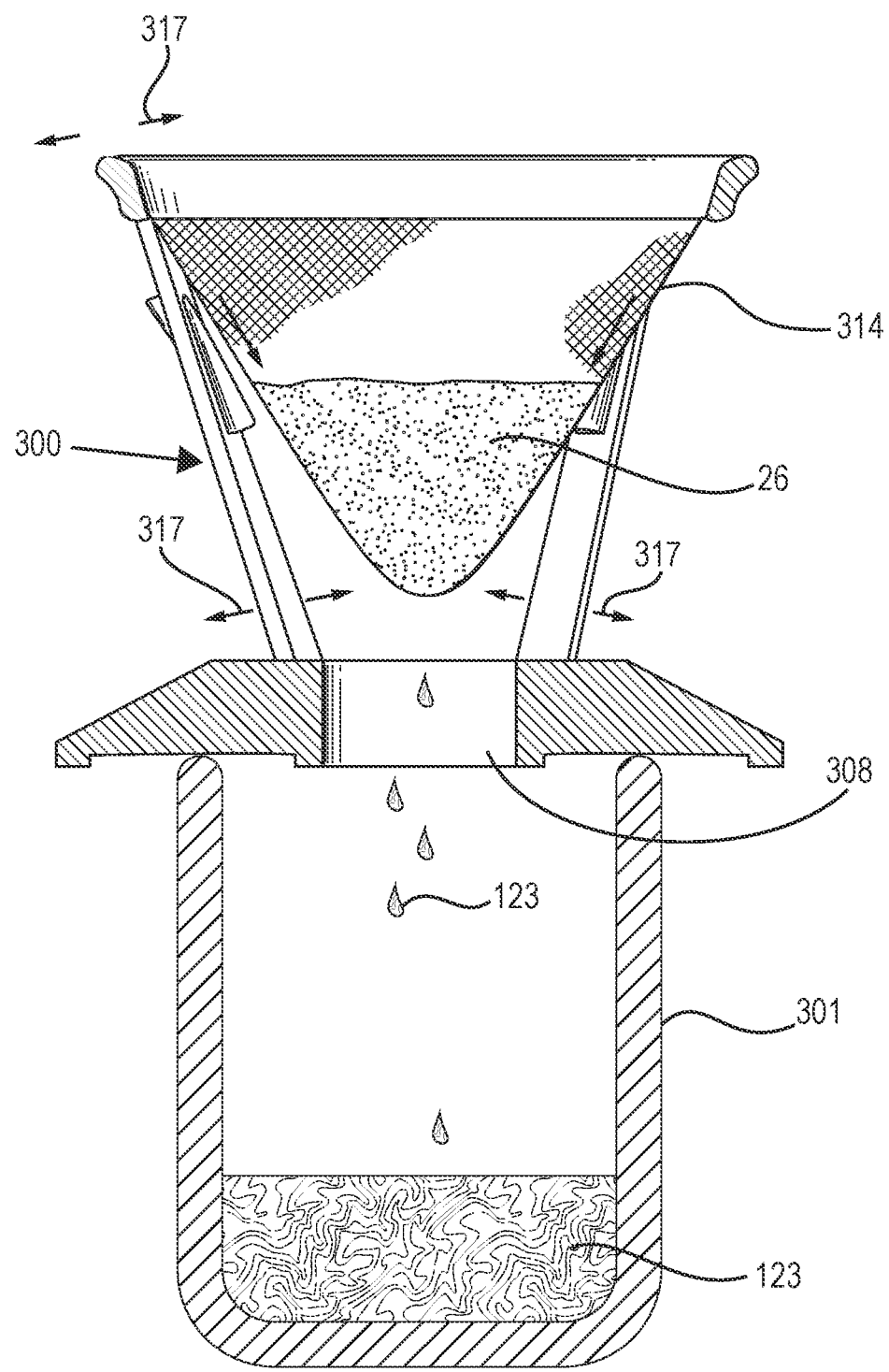
FIG. 28 is a schematic elevation view of the agitator embodiment of FIG. 27 disposed and operatively coupled to the cup with the filter basket operatively coupled to the agitator and water being poured over the solid infusion material as vibration energy is being applied to the filter basket and infusion mixture therein as the infused liquid is drawn by gravity into the cup.

Regarding use embodiments of the agitator 300, FIGS. 26-28 show a method of infusing a liquid including disposing the lower surface 306 of the housing base of the agitator 300 onto the upper edge 323 of a cup. An upper ring 316 of the filter basket 314 may also be engaged with upper surfaces of upper ends 311 of a plurality of support extensions 307 of the agitator 300. A solid material 136 such as coffee grounds or any other suitable infusable solid material may be disposed into the interior volume 315 of the filter basket 314 as shown in FIG. 26. A liquid 138, such as hot or cold water, or any other liquid 138 suitable for infusing a solid material 136, may be added to the solid material 136 in the interior volume 315 of the filter basket 314 as shown in FIG. 27 so as to form the infusion mixture 26. The method may also include activating the vibration source 12 of the agitator 300 as shown in FIG. 28. The vibration source (or sources) 12 may be operatively coupled to the upper section 313 of the support extension (extensions) 307 so as to be configured to generate and emit vibration energy therefrom. The vibration energy (indicated by arrows 317 in FIG. 28) emitted from the vibration source (sources) 12 may be transmitted from the upper section 313 of the support extension (extensions) 307 through the upper ring 316 of the filter basket 314, through a conical body of the filter basket 314 and into the infusion mixture 26 which is disposed within the interior volume 315 of the filter basket 314. The method may further include collecting infused liquid 26, in this example coffee, falling from the filter basket 314 into an interior volume of the cup 301 also as shown in FIG. 28.

For some embodiments of this method, the agitator 300 includes a plurality of vibration sources 12 with each vibration source 12 operatively coupled to the upper section 313 of a different support extension 307 and the method includes activating the plurality of vibration sources 12 simultaneously, sequentially, or in any desired pattern so as to generate and emit vibration energy therefrom. This vibration energy may then be transmitted from the respective upper sections 313 of the plurality of support extensions 307 through the upper ring 216 of the filter basket 314, through a conical body of the filter basket 314 and into the infusion mixture 26 which is disposed within the interior volume 315 of the filter basket 314.

As shown in FIG. 28, in some cases, the method may include passing infused liquid 26 falling from the filter basket 314 through a central aperture 308 of the housing base and into the interior volume of the cup 301. As discussed above, in some cases, the controller 14 may be programmed by a user to generate a predetermined and desired schedule of vibration generation. In such cases, the method may include programming the controller 14 of the agitator 300 to emit a predetermined schedule of vibration energy from the vibration source (sources) 12 and emitting the predetermined schedule of vibration energy from the vibration source (sources) 12 upon activation of the vibration source (sources) 12. In some instances, programming the controller 14 may include programming the controller 14 of the agitator 300 with a wireless remote controller 108 as discussed above. In some instances, the method may also include activating the vibration source (sources) 12 with the wireless remote controller 108 which is wirelessly and operatively coupled to the controller 14 which is operatively coupled to the vibration source (sources) 12.

Embodiments illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation and use of such terms and expressions do not exclude any equivalents of the features shown and described or portions thereof, and various modifications are possible. The term "a" or "an" can refer to one of or a plurality of the elements it modifies (e.g., "a reagent" can mean one or more reagents) unless it is contextually clear either one of the elements or more than one of the elements is described. Thus, it should be understood that although embodiments have been specifically disclosed by representative embodiments and optional features, modification and variation of the concepts herein disclosed may be resorted to by those skilled in the art, and such modifications and variations are considered within the scope of this disclosure.

With regard to the above detailed description, like reference numerals used therein refer to like elements that may have the same or similar dimensions, materials and configurations. While particular forms of embodiments have been illustrated and described, it will be apparent that various modifications can be made without departing from the spirit and scope of the embodiments of the invention. Accordingly, it is not intended that the invention be limited by the forgoing detailed description.

What is claimed is:

1. An agitator for enhancing infusion of a liquid, comprising:
   a housing base that includes a rigid annular configuration, an upper surface, a lower surface which is disposed opposite the upper surface, an interior cavity disposed between the upper surface and the lower surface and an aperture extending from the upper surface to the lower surface;
   a plurality of support extensions which each have a resilient configuration, which each have a lower end secured to the housing base about the aperture, and which each have an upper end that extends in an upward direction from the upper surface;
   a vibration source disposed on and operatively coupled to an upper section of a support extension;
   a controller in operative communication with the vibration source; and
   a power source operatively coupled to the controller.

2. The agitator of claim 1, wherein the lower surface of the housing includes a cup retainer that is configured to engage an upper edge of a cup.

3. The agitator of claim 1, wherein the cup retainer includes a ridge extending downward from the lower surface.

4. The agitator of claim 3, wherein the cup retainer includes an inner ridge and an outer ridge extending downward from the lower surface of the housing.

5. The agitator of claim 1, wherein the upper end of each of the support extensions extend in an upward direction from the upper surface to a common separation from the upper surface of the housing with the upper ends of the respective plurality of support extensions lying substantially in a common plane.

6. The agitator of claim 1, wherein the aperture comprises a central aperture, the support extensions extend in an upward and radially outward direction from the upper surface of the housing and the respective lower ends of the support extensions are secured to the upper surface of the housing base in locations disposed substantially about a common radius measured from a longitudinal axis of the central aperture.

7. The agitator of claim 1, further comprising a plurality of vibrations sources and wherein each vibration source is disposed on and operatively coupled to an upper section of a different support extension of the plurality of support extensions.

8. The agitator of claim 1, further comprising a filter basket having an interior volume at least partially bounded by a filter material and an upper ring defining an upper aperture, the upper ring being configured to engage an upper end of each of the plurality of support extensions so as to provide upward support and coupling of vibration energy to the filter basket when the filter basket is engaged with the support extensions.

9. The agitator of claim 8, wherein the filter basket comprises a conical shape.

10. The agitator of claim 1, wherein the housing base includes a sealed interior volume and the power source and controller are disposed within the sealed interior volume of the housing base.

11. The agitator of claim 1, wherein the controller which is disposed in operative communication with the vibration source is disposed within the interior cavity of the housing base and is configured for wireless communication with an external remote controller device.

12. The agitator of claim 1, further comprising a vibration isolation pad disposed on and secured to the lower surface of the housing base.

13. The agitator of claim 12, wherein the vibration isolation pad comprises a flat annular ring configuration having a central aperture.

14. A method of infusing a liquid, comprising:
   disposing a lower surface of a housing base of an agitator onto an upper edge of a cup;
   engaging an upper ring of a filter basket with upper ends of a plurality of support extensions of the agitator;
   disposing a solid material into an interior volume of the filter basket;
   adding liquid to the solid material in the interior volume of the filter basket to form an infusion mixture;
   activating a vibration source which is operatively coupled to an upper section of a support extension so as to generate and emit vibration energy therefrom;
   transmitting the vibration energy from the upper section of the support extension through the upper ring of the filter basket, through a body of the filter basket and into the infusion mixture which is disposed within the interior volume of the filter basket; and
   collecting infused liquid falling from the filter basket into an interior volume of the cup.

15. The method of claim 14 wherein the solid material comprises coffee grounds and the liquid comprises hot water and collecting infused liquid falling from the filter basket comprises collecting coffee into the interior volume of the cup.

16. The method of claim 14 wherein the agitator comprises a plurality of vibration sources with each vibration source operatively coupled to an upper section of a different support extension and further comprising activating the plurality of vibration sources so as to generate and emit vibration energy therefrom.

17. The method of claim 16 further comprising transmitting the vibration energy from the upper section of a plurality of support extensions through the upper ring of the filter basket, through a body of the filter basket and into the infusion mixture which is disposed within the interior volume of the filter basket.

18. The method of claim 14 further comprising passing infused liquid falling from the filter basket through a central aperture of the housing base and into an interior volume of the cup.

19. The method of claim 14 further comprising programming a controller of the agitator to emit a predetermined schedule of vibration energy from the vibration source and emitting the predetermined schedule of vibration energy from the vibration source upon activation of the vibration source.

20. The method of claim 19 further comprising programming the controller of the agitator with a wireless remote control.

21. The method of claim 14 further comprising activating the vibration source with a wireless remote control which is wirelessly and operatively coupled to a controller which is operatively coupled to the vibration source.

\* \* \* \* \*